(12) United States Patent
Miwa et al.

(10) Patent No.: US 9,380,172 B2
(45) Date of Patent: Jun. 28, 2016

(54) IMAGE FORMING APPARATUS HAVING IMAGE READING DEVICE

(71) Applicant: Brother Kogyo Kabushiki Kaisha, Nagoya (JP)

(72) Inventors: Atsushi Miwa, Anjo (JP); Shougo Sato, Seto (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 14/666,655

(22) Filed: Mar. 24, 2015

(65) Prior Publication Data

US 2015/0278650 A1 Oct. 1, 2015

(30) Foreign Application Priority Data

Mar. 28, 2014 (JP) ................. 2014-069737

(51) Int. Cl.
*G06K 15/00* (2006.01)
*H04N 1/00* (2006.01)

(52) U.S. Cl.
CPC ...................................... *H04N 1/00* (2013.01)

(58) Field of Classification Search
None
See application file for complete search history.

(56) References Cited

U.S. PATENT DOCUMENTS

| | | | | |
|---|---|---|---|---|
| 6,057,936 A * | 5/2000 | Obara | ................ | H04N 1/00519 358/296 |
| 6,352,326 B1 * | 3/2002 | Maeda | .................. | B41J 11/008 347/12 |
| 6,470,156 B1 * | 10/2002 | Sahay | .................... | G03G 15/50 399/82 |
| 2001/0030765 A1 * | 10/2001 | Komada | ............. | G03G 15/6514 358/1.12 |
| 2002/0056957 A1 * | 5/2002 | Sekine | ............... | H04N 1/00519 271/3.14 |
| 2005/0151782 A1 * | 7/2005 | Ishida | ...................... | B41J 29/02 347/37 |
| 2006/0044632 A1 * | 3/2006 | Aoyama | ............. | H04N 1/1017 358/497 |
| 2006/0204298 A1 * | 9/2006 | Hari | ..................... | G03G 15/602 399/367 |
| 2008/0181695 A1 * | 7/2008 | Andoh | ............... | G03G 15/6552 399/361 |
| 2010/0061781 A1 * | 3/2010 | Won | ....................... | B65H 5/062 399/367 |
| 2010/0078884 A1 * | 4/2010 | Uehara | ............. | G03G 21/1638 271/314 |
| 2011/0188097 A1 * | 8/2011 | Asada | ...................... | H04N 1/04 358/498 |
| 2011/0233859 A1 * | 9/2011 | Watanabe | ............. | B65H 29/52 271/271 |

(Continued)

FOREIGN PATENT DOCUMENTS

JP H08-110665 A 4/1996
JP H10-301349 A 11/1998

(Continued)

OTHER PUBLICATIONS

U.S. Appl. No. 14/666,709, filed Mar. 24, 2015, Miwa et al.

(Continued)

*Primary Examiner* — Ted Barnes
(74) *Attorney, Agent, or Firm* — Burr & Brown, PLLC

(57) ABSTRACT

In an image forming apparatus, when a pivot plate is at a closed position, a free end of the pivot plate is at a vertical level higher than first and second hinge portions which are arranged apart from each other in a width direction along a horizontal direction. A free end of the pivot plate moves in a space defined between first and second virtual vertical planes. The first virtual vertical plane is defined as a virtual vertical plane, on which a widthwise inner end of a first hinge portion is disposed, and which is perpendicular to a rotational center axis of the first hinge portion. The second virtual vertical plane is defined as a virtual vertical plane, on which a widthwise inner end of the second hinge portion is disposed, and which is perpendicular to a rotational center axis of the second hinge portion.

11 Claims, 12 Drawing Sheets

(56) References Cited

U.S. PATENT DOCUMENTS

| | | | | |
|---|---|---|---|---|
| 2012/0098188 A1* | 4/2012 | Ito | .................... | B65H 31/02 |
| | | | | 271/207 |
| 2012/0113485 A1* | 5/2012 | Sakita | .................... | G02B 26/123 |
| | | | | 358/475 |
| 2012/0274994 A1* | 11/2012 | Westcott | .................... | H04N 1/0464 |
| | | | | 358/498 |
| 2013/0121741 A1* | 5/2013 | Shibata | .................... | G03G 15/605 |
| | | | | 399/380 |
| 2015/0002869 A1* | 1/2015 | Osaki | .................... | B65G 57/11 |
| | | | | 358/1.12 |
| 2015/0022835 A1* | 1/2015 | Mori | .................... | G06K 15/16 |
| | | | | 358/1.12 |
| 2015/0116796 A1* | 4/2015 | Urita | .................... | H04N 1/10 |
| | | | | 358/497 |
| 2015/0123343 A1* | 5/2015 | Sei | .................... | B65H 29/58 |
| | | | | 271/290 |

FOREIGN PATENT DOCUMENTS

| | | |
|---|---|---|
| JP | 2000-200017 A | 7/2000 |
| JP | 2003-122075 A | 4/2003 |
| JP | 2010-079049 A | 4/2010 |
| JP | 2011-197559 A | 10/2011 |

OTHER PUBLICATIONS

U.S. Office Action, U.S. Appl. No. 14/666,709, dated Oct. 6, 2015 (11 pages).

* cited by examiner

IMAGE FORMING APPARATUS HAVING IMAGE READING DEVICE

CROSS REFERENCE TO RELATED APPLICATION

This application claims priority from Japanese Patent Application No. 2014-069737 filed Mar. 28, 2014. The entire content of the priority application is incorporated herein by reference.

TECHNICAL FIELD

The present disclosure relates to an image forming apparatus for forming an image on a sheet.

BACKGROUND

Japanese Patent Application Publication No. 2011-197559 has proposed an image forming apparatus having a rear cover and an outer shoot. A gap between the rear cover and the outer shoot constitutes a sheet re-conveying path that is used for re-conveying a sheet to an image forming section during a duplex printing process. The rear cover and the outer shoot can be opened by being pivotally moved rearward. In a state where the rear cover and the outer shoot are opened, a sheet having an image formed thereon is discharged along a straight path onto the rear cover and the outer shoot. This discharge process is called as a "straight discharge process". According to the straight discharge process, after a sheet is formed with an image, the sheet is discharged out of the image forming apparatus, without being turned along a curved path.

SUMMARY

An object of the present disclosure is to provide an improved image forming apparatus that can perform a straight discharge process.

According to one aspect, an image forming apparatus includes: an image forming portion; an apparatus body; a discharge roller; a pivot plate; an image reading device; and a pair of hinge portions. The image forming portion is configured to form an image on a sheet. The apparatus body has a housing configured to enclose the image forming portion therein. The housing has a sheet discharge tray at its vertically upper portion. The sheet discharge tray is configured to receive thereon a sheet having an image formed thereon. The discharge roller is provided in a first conveying path and configured to discharge, onto the sheet discharge tray, a sheet that has been conveyed by the first conveying path. The first conveying path has a curved part that is configured to guide a sheet, which has been conveyed from the image forming portion, to the discharge roller, while changing an orientation of the sheet. The pivot plate is pivotally movable relative to the apparatus body between an open position and a closed position. The pivot plate at the open position constitutes a second conveying path. The second conveying path is a straight path configured to guide a sheet, which has been conveyed from the image forming portion, linearly toward an outside of the housing. The pivot plate at the closed position closes the second conveying path. The image reading device is provided at a vertical level higher than the sheet discharge tray. The pair of hinge portions connects the image reading device to the apparatus body such that the image reading device is pivotally movable relative to the apparatus body. The pair of hinge portions includes a first hinge portion and a second hinge portion which are arranged apart from each other in a width direction along a horizontal direction. Each of the first and second hinge portions is elongated in the width direction. The first hinge portion has a widthwise inner end and a widthwise outer end opposite to each other in the width direction. The widthwise inner end of the first hinge portion is closer to the second hinge portion than the widthwise outer end of the first hinge portion is in the width direction. The second hinge portion has a widthwise inner end and a widthwise outer end opposite to each other in the width direction. The widthwise inner end of the second hinge portion is closer to the first hinge portion than the widthwise outer end of the second hinge portion is in the width direction. The pivot plate is arranged relative to the pair of hinge portions such that when the pivot plate is at the closed position, a free end of the pivot plate is positioned at a vertical level higher than the pair of hinge portions. The pivot plate is arranged relative to the pair of hinge portions such that the free end of the pivot plate moves in a space defined between a first virtual vertical plane and a second virtual vertical plane. The first virtual vertical plane is defined as a virtual vertical plane, on which the widthwise inner end of the first hinge portion is disposed, and which is perpendicular to a rotational center axis of the first hinge portion. The second virtual vertical plane is defined as a virtual vertical plane, on which the widthwise inner end of the second hinge portion is disposed, and which is perpendicular to a rotational center axis of the second hinge portion.

According to another aspect, an image forming apparatus includes: an image forming portion; an apparatus body; a discharge roller; a pivot plate; an image reading device; and a pair of hinge portions. The image forming portion is configured to form an image on a sheet. The apparatus body has a housing configured to enclose the image forming portion therein. The housing has a sheet discharge tray at its vertically upper portion. The sheet discharge tray is configured to receive thereon a sheet having an image formed thereon. The discharge roller is provided in a first conveying path and configured to discharge, onto the sheet discharge tray, a sheet that has been conveyed by the first conveying path. The first conveying path has a curved part that is configured to guide a sheet, which has been conveyed from the image forming portion, to the discharge roller, while changing an orientation of the sheet. The pivot plate is pivotally movable relative to the apparatus body between an open position and a closed position. The pivot plate at the open position constitutes a second conveying path. The second conveying path is a straight path configured to guide a sheet, which has been conveyed from the image forming portion, linearly toward an outside of the housing. The pivot plate at the closed position closes the second conveying path. The image reading device is provided at a vertical level higher than the sheet discharge tray. The image reading device has a document cover configured to move between a position where the document cover covers a document table and a position where the document cover exposes the document table. The document table is configured to receive a document mounted thereon. The pair of hinge portions connects the document cover to the document table such that the document cover is pivotally movable relative to the document table. The pair of hinge portions includes a first hinge portion and a second hinge portion which are arranged apart from each other in a width direction along a horizontal direction. Each of the first and second hinge portions is elongated in the width direction. The first hinge portion having a widthwise inner end and a widthwise outer end opposite to each other in the width direction. The widthwise inner end of the first hinge portion is closer to the second hinge portion than the widthwise outer end of the first hinge portion is in the width direction. The second hinge portion has a widthwise inner end and a widthwise outer end opposite to each other in the width direction. The widthwise inner end of the second hinge portion is closer to the first hinge portion than the widthwise outer end of the second hinge portion is in the width direction. The pivot plate is arranged relative to the image reading device such that when the pivot plate is at the closed position, a free end of the pivot plate is positioned at a vertical level higher than a lower end of the image reading device. The pivot plate is arranged relative to the pair of hinge portions such that the free end of the pivot plate moves in a space defined between a first virtual vertical plane and a second virtual vertical plane. The first virtual vertical plane is defined as a virtual vertical plane, on which the widthwise inner end of the first hinge portion is disposed, and which is perpendicular to a rotational center axis of the first hinge portion. The second virtual vertical plane is defined as a virtual vertical plane, on which the widthwise inner end of the second hinge portion is disposed, and which is perpendicular to a rotational center axis of the second hinge portion.

BRIEF DESCRIPTION OF THE DRAWINGS

The particular features and advantages of the disclosure will become apparent from the following description taken in connection with the accompanying drawings, in which:

FIGS. 10A and 10B illustrate how the pivot plate and a switching guide portion are situated during the non-straight discharge, wherein FIG. 10A is a perspective view as viewed from the left-rear side and FIG. 10B is a left side view;

FIGS. 11A and 11B illustrate how the pivot plate and the switching guide portion are situated during the straight discharge, wherein FIG. 11A is a perspective view as viewed from the left-rear side and FIG. 11B is a left side view;

DETAILED DESCRIPTION

Figure 1:
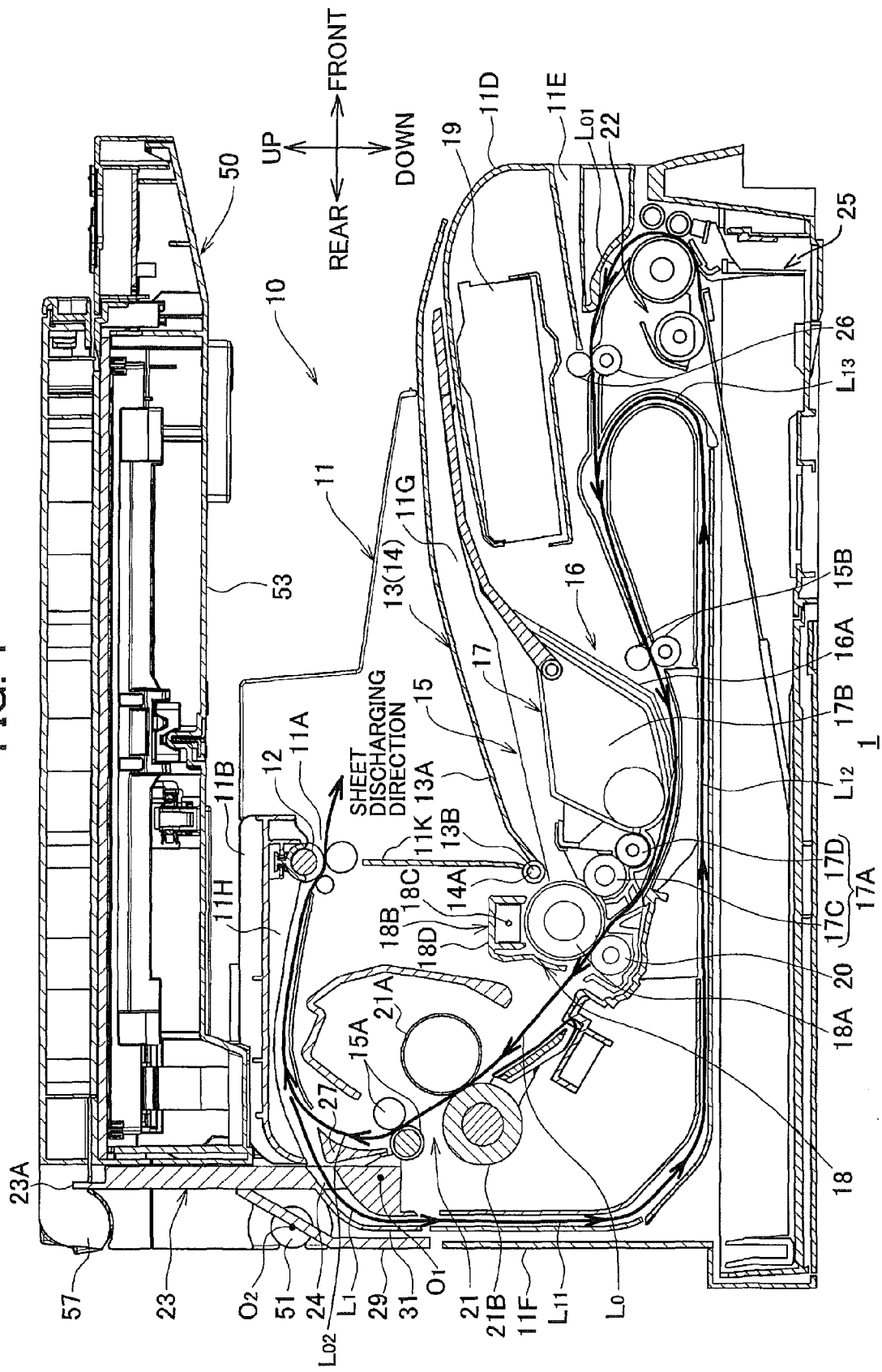
FIG. 1 is a center cross-sectional view of an image forming apparatus according to a first embodiment, showing how a printer section performs a non-straight discharge.

An image forming apparatus according to embodiments will be described while referring to the accompanying drawings wherein like parts and components are designated by the same reference numerals to avoid duplicating description.

(First Embodiment)

1. General Structure of Image Forming Apparatus

An image forming apparatus 1 according to a first embodiment is a monochromatic image forming apparatus. The image forming apparatus 1 has a printer section 10 and a scanner section 50 integrated together as shown in FIG. 1. The printer section 10 is a printing device configured to form an image on a sheet such as a sheet of paper. The scanner section 50 is an image reading unit configured to read an image (and letters) from a document.

Figure 2:
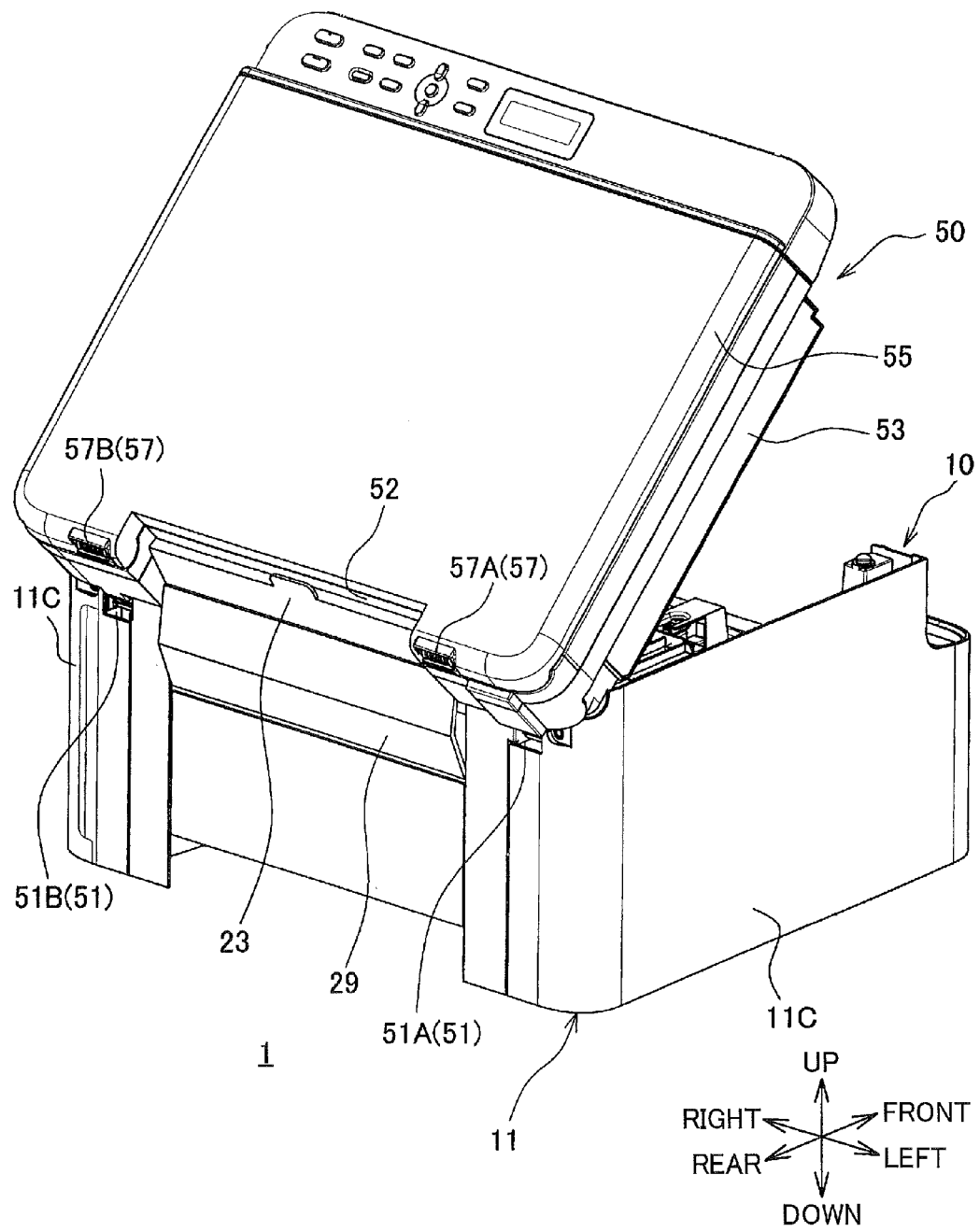
FIG. 2 is a perspective view of the image forming apparatus as viewed from a left-rear side, in which a scanner section has been pivotally moved away from a sheet discharge tray of a printer section.

The scanner section 50 is disposed above the printer section 10. The printer section 10 has a sheet discharge tray 13 at a position below the scanner section 50. Sheets having images formed thereon are discharged onto the sheet discharge tray 13. As shown in FIG. 2, the scanner section 50 is connected to an apparatus body of the printer section 10 via a scanner hinge portion 51 such that the scanner section 50 is pivotally movable relative to the apparatus body of the printer section 10. As illustrated in FIG. 1, the scanner hinge portion 51 is disposed at an upper and rear portion of the printer section 10.

It is noted that directions used in the present description in relation to the image forming apparatus 1 reference the state of the image forming apparatus 1 when the image forming apparatus 1 is resting on a horizontal surface. More specifically, regarding the vertical direction, the side of the image forming apparatus 1 on which the scanner section 50 is provided (the upper side in FIG. 1) is referred to as the "upper side," and the opposite side (the lower side in FIG. 1) as the "lower side". Regarding the horizontal direction, the side of the image forming apparatus 1 in which the scanner hinge portion 51 is provided is referred to as the "rear side," while the opposite side is referred to as the "front side". Further, left and right sides of the image forming apparatus 1 are defined based on the perspective of a user looking at the image forming apparatus 1 from the front. Specifically, directions related to the image forming apparatus 1 correspond to arrows shown in the drawings. Thus, the left side of FIG. 1 is the rear, the right side is the front, the near side the left side, and the far side is the right side. A width direction is defined as the same as the left-right direction. The width direction is perpendicular to both of: a sheet conveying direction, along which sheets are conveyed in the printer section 10; and a sheet thickness direction of the sheets conveyed in the printer section 10.

The apparatus body is part of the printer section 10 that is not disassembled by a user when the user uses the image forming apparatus 1. The apparatus body includes a housing 11 and a frame (not shown). The frame includes plate-shaped members that are arranged apart from one another in the horizontal direction. The frame has relatively high mechanical strength. Components constituting the printer section 10 are assembled to the frame.

The scanner section 50 can be pivotally moved about the scanner hinge portion 51 relative to the printer section 10 between: a horizontal position (shown in FIGS. 1 and 3) in which the scanner section 50 extends horizontally and is disposed directly above the sheet discharge tray 13 of the printer section 10; and a tilted position (shown in FIGS. 2 and 9) in which the scanner section 50 has been pivotally moved away from the sheet discharge tray 13.

Figure 4:
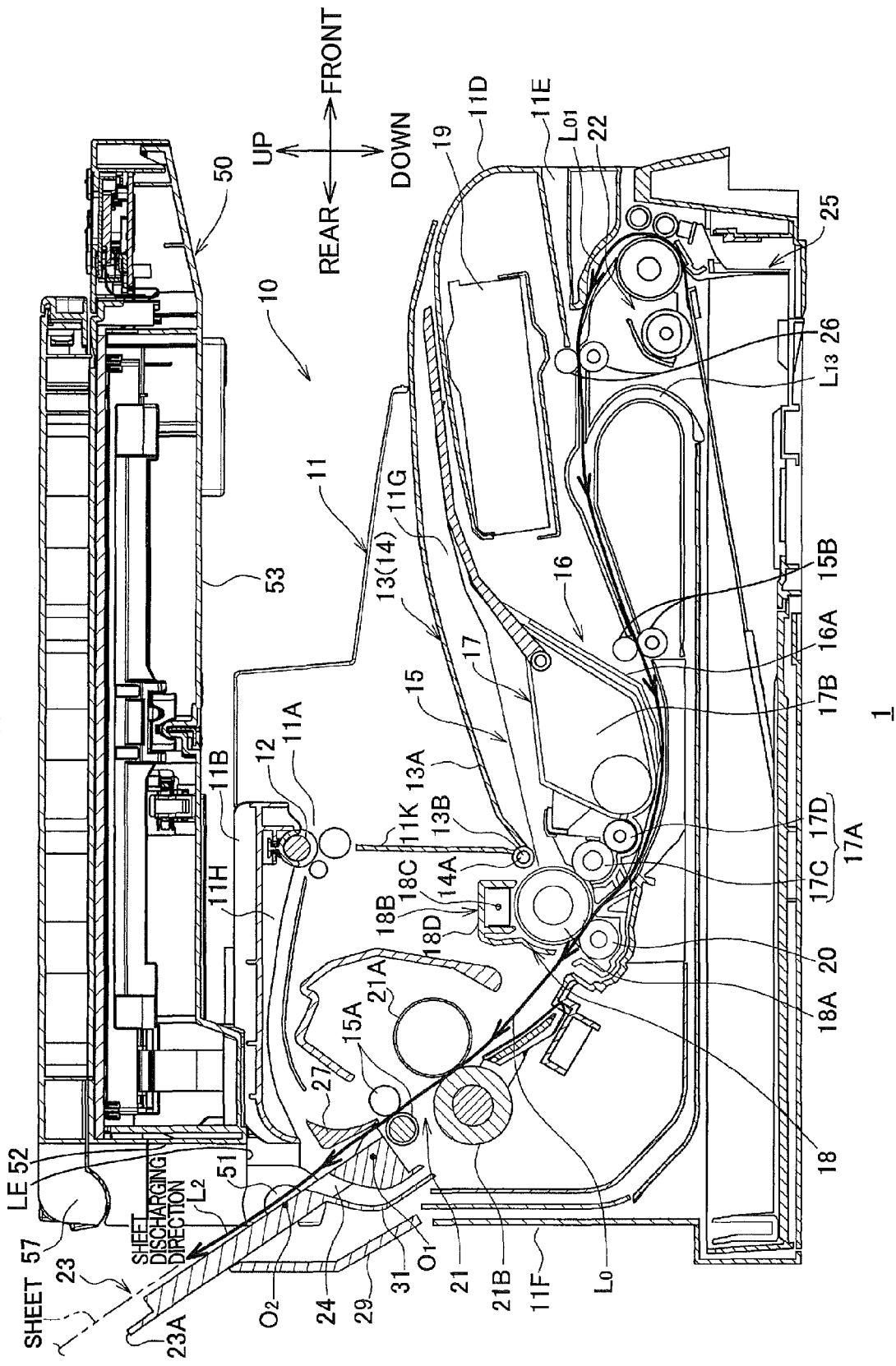
FIG. 4 is a center cross-sectional view of the image forming apparatus, showing how the printer section performs a straight discharge.
Figure 9:
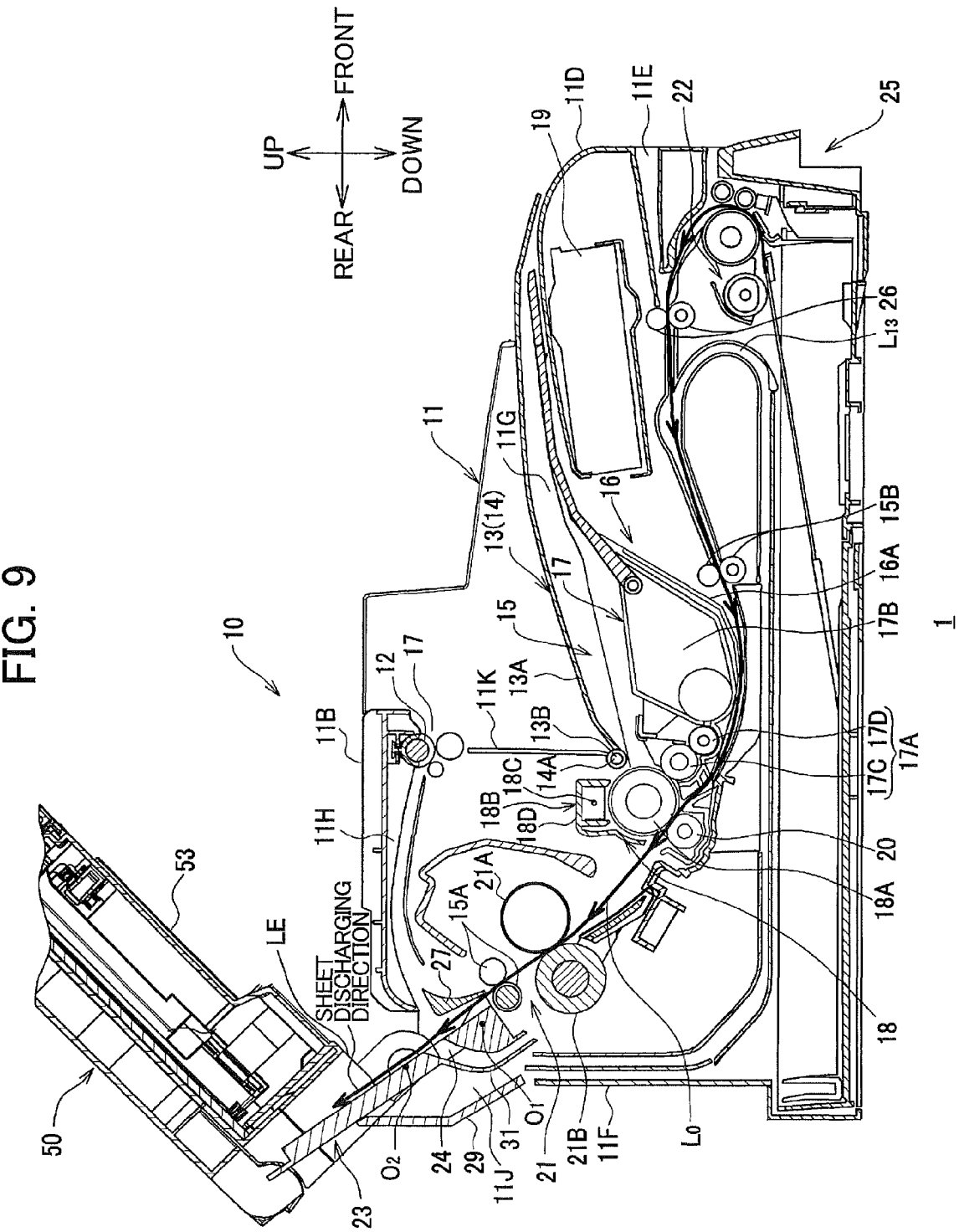
FIG. 9 is a center cross-sectional view of the image forming apparatus, in which the scanner section has been pivotally moved away from the sheet discharge tray.

As shown in FIGS. 4 and 9, the scanner section 50 has a lower end LE. The lower end LE is part of the scanner section 50 that is located at the vertically lowest position within the entire part of the scanner section 50 when the scanner section 50 is at the horizontal position as shown in FIG. 4.

Figure 3:
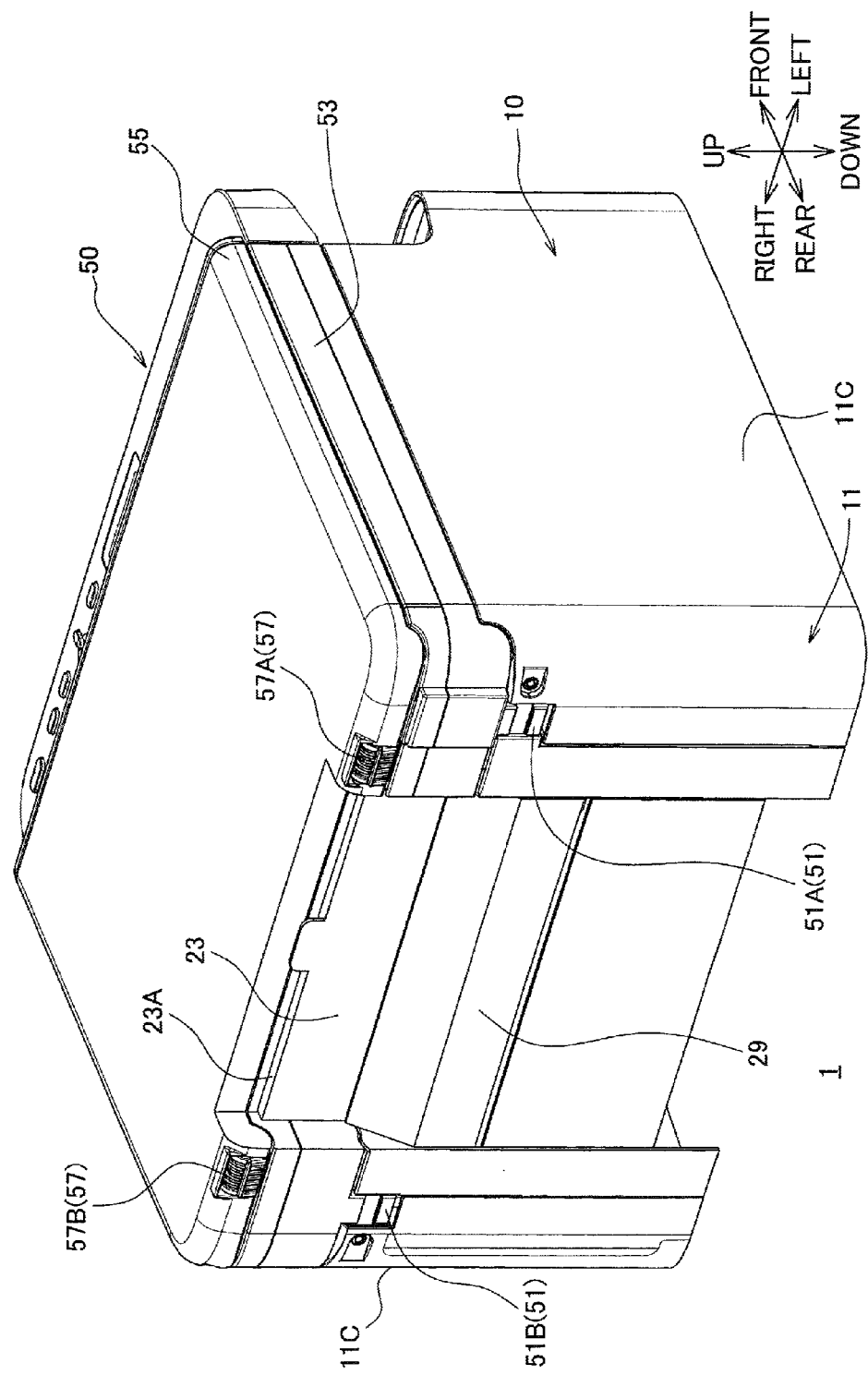
FIG. 3 is a perspective view of the image forming apparatus as viewed from the left-rear side.

As illustrated in FIG. 3, the scanner hinge portion 51 includes a first scanner hinge 51A and a second scanner hinge 51B which are disposed apart from each other in the width direction (horizontal direction).

Figure 6:
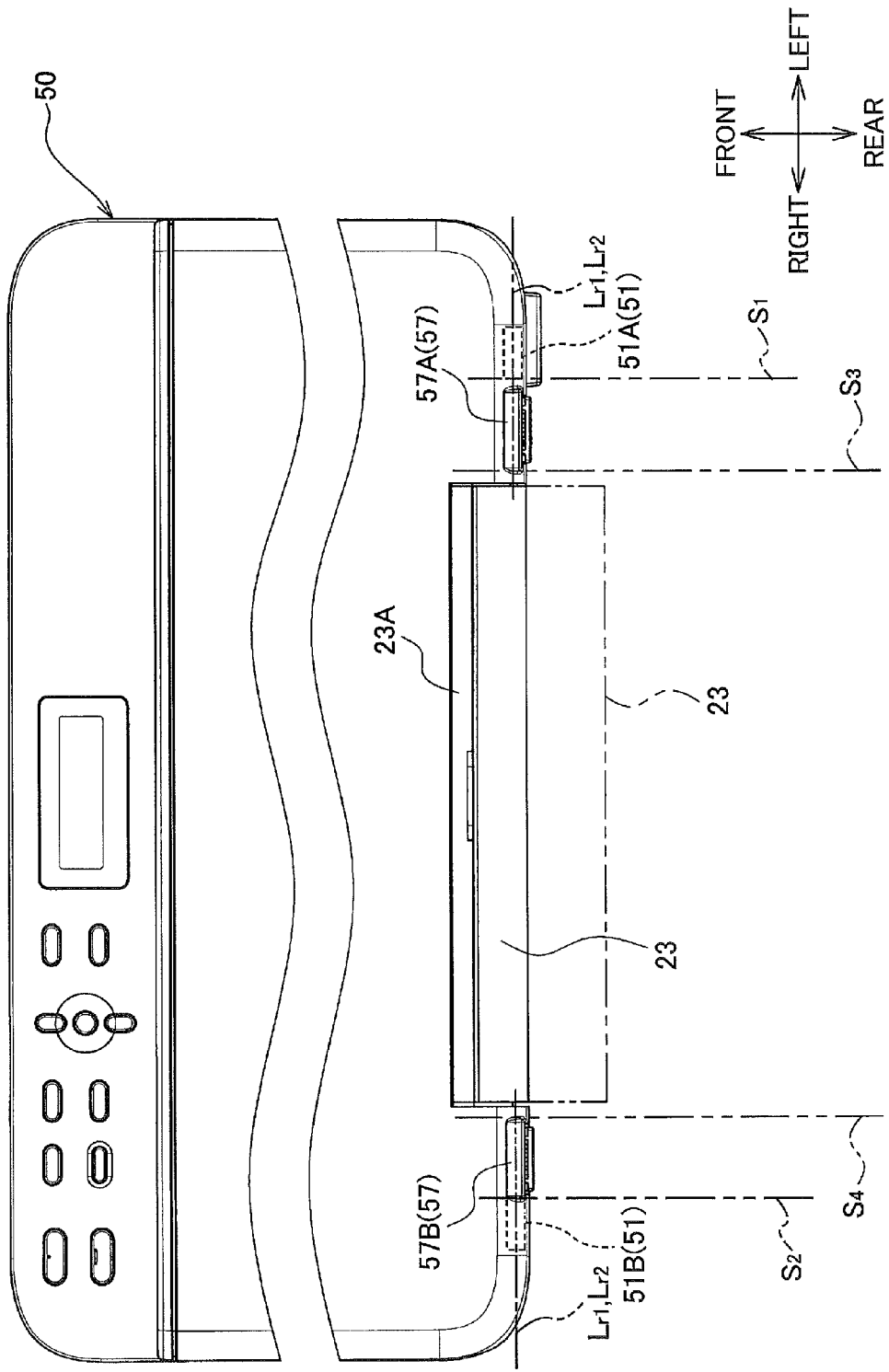
FIG. 6 is a top view of the image forming apparatus.

As shown in FIG. 6, the first scanner hinge 51A is elongated in the width direction, and has a widthwise outer end and a widthwise inner end that are opposite to each other in the width direction. In the first scanner hinge 51A, the widthwise inner end is disposed closer to the second scanner hinge 51B than the widthwise outer end is in the width direction.

Similarly to the first scanner hinge 51A, the second scanner hinge 51B is elongated in the width direction, and has a widthwise outer end and a widthwise inner end that are opposite to each other in the width direction. In the second scanner hinge 51B, the widthwise inner end is disposed closer to the first scanner hinge 51A than the widthwise outer end is in the width direction.

The first and second scanner hinges 51A, 51B are rotatably supported to the frame of the apparatus body of the printer section 10. As shown in FIG. 6, center axes of rotations of the first and second scanner hinges 51A, 51B are aligned with each other along the width direction. The center axes of rotations of the first and second scanner hinges 51A, 51B will be collectively referred to as "center axes Lr1 of rotations of the first and second scanner hinges 51A, 51B" hereinafter.

The center axes Lr1 of rotations of the first and second scanner hinges 51A, 51B serve as a center axis O2 of pivotal movement of the scanner section 50 shown in FIG. 1. The center axis O2 of pivotal movement of the scanner section 50 is fixed at an upper and rear portion of the apparatus body.

As shown in FIG. 6, a first virtual vertical plane 51 is defined as a virtual vertical plane, on which the widthwise inner end of the first scanner hinge 51A is located and which is perpendicular to the center axes Lr1 of rotations of the first and second scanner hinges 51A, 51B.

A second virtual vertical plane S2 is defined as a virtual vertical plane, on which the widthwise inner end of the second scanner hinge 51B is located and which is perpendicular to the center axes Lr1 of rotations of the first and second scanner hinges 51A, 51B.

As illustrated in FIG. 3, the scanner section 50 includes a document table 53 and a document cover 55. A document can be placed on the document table 53.

Figure 8:
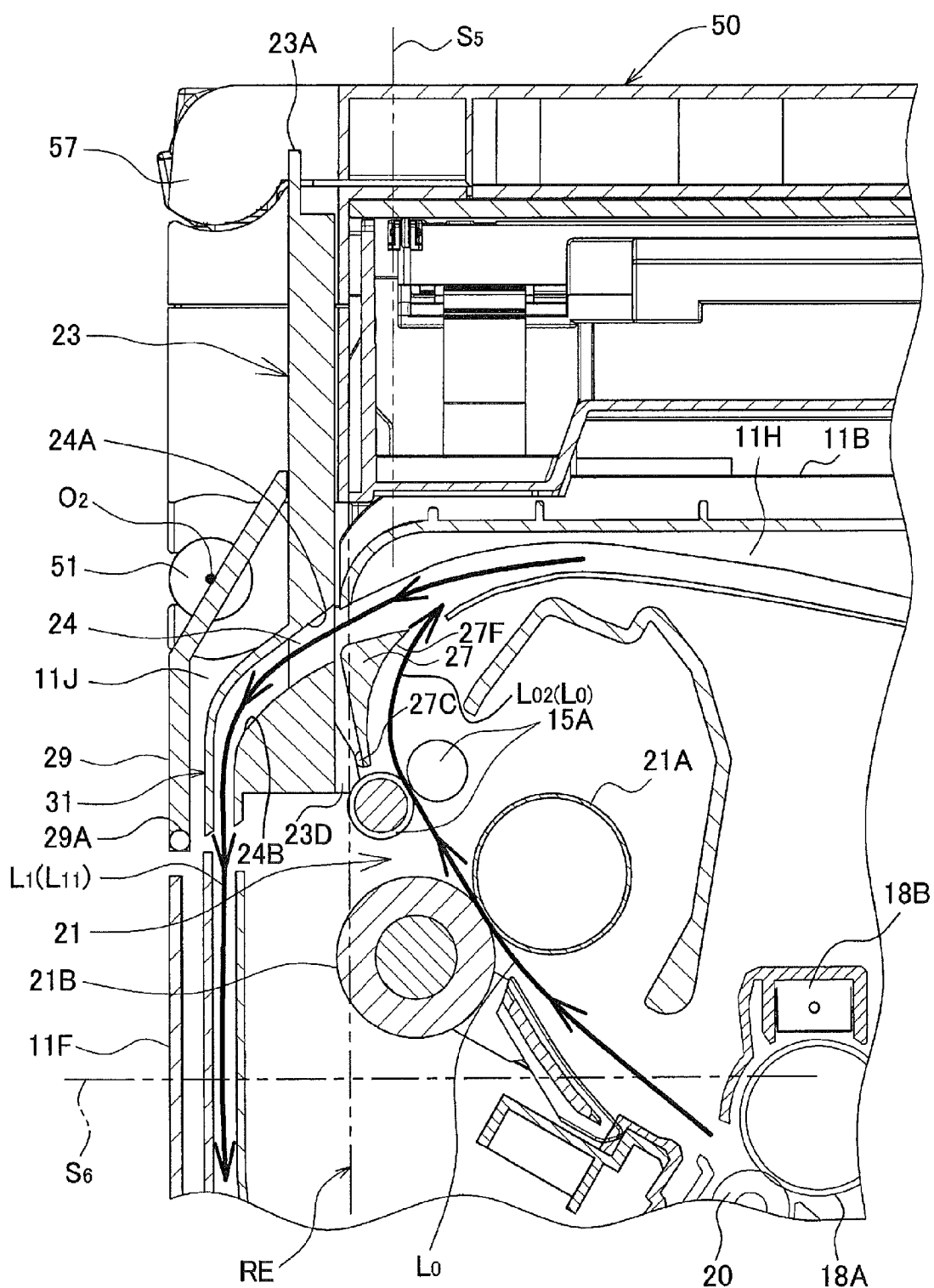
FIG. 8 is an enlarged cross-sectional view of the part of the image forming apparatus around the pivot plate when the printer section is performing the non-straight discharge and a duplex printing.

Although not shown in the drawings, a reading element, such as a CCD or a CIS, and a scanning mechanism are housed in the document table 53. The reading element receives light that is reflected from a document placed on the document table 53 when the document is irradiated with light, and converts the received light into an electrical signal. The scanning mechanism scans the reading element relative to the document placed on the document table 53. FIG. 8 indicates a rear end RE of a movable range, in which the reading element is movable by the scanning mechanism in the scanner section 50.

The document cover 55 is pivotally connected to the document table 53 by a cover hinge portion 57. The document cover 55 can be displaced between: a position where the document cover 55 covers the document table 53 from above; and a position where the document cover 55 exposes the document table 53.

As shown in FIG. 3, the cover hinge portion 57 has a first cover hinge 57A and a second cover hinge 57B which are disposed apart from each other in the width direction (horizontal direction).

As shown in FIG. 6, the first cover hinge 57A is elongated in the width direction, and has a widthwise outer end and a widthwise inner end that are opposite to each other in the width direction. In the first cover hinge 57A, the widthwise inner end is disposed closer to the second cover hinge 57B than the widthwise outer end is in the width direction.

Similarly to the first cover hinge 57A, the second cover hinge 57B is elongated in the width direction, and has a widthwise outer end and a widthwise inner end that are opposite to each other in the width direction. In the second cover hinge 57B, the widthwise inner end is disposed closer to the first cover hinge 57A than the widthwise outer end is in the width direction.

The first and second cover hinges 57A, 57B are rotatably supported to the frame of the apparatus body of the printer section 10. As shown in FIG. 6, center axes of rotations of the first and second cover hinges 57A, 57B are aligned with each other along the width direction. The center axes of rotations of the first and second cover hinges 57A, 57B will be collectively referred to as "center axes Lr2 of rotations of the first and second cover hinges 57A, 57B" hereinafter.

As shown in FIG. 6, a third virtual vertical plane S3 is defined as a virtual vertical plane, on which the widthwise inner end of the first cover hinge 57A is located and which is perpendicular to the center axes Lr2 of rotations of the first and second cover hinges 57A, 57B.

A fourth virtual vertical plane S4 is defined as a virtual vertical plane, on which the widthwise inner end of the second cover hinge 57B is located and which is perpendicular to the center axes Lr2 of rotations of the first and second cover hinges 57A, 57B.

2. Configuration of Printer Section

As illustrated in FIG. 1, an image forming section 15 is housed in the housing 11 of the printer section 10. The image forming section 15 serves to form an image on a sheet. A sheet discharge port 11A and the sheet discharge tray 13 are provided at vertically upper portions of the housing 11. A sheet which has been subjected to an image forming process by the image forming section 15 is discharged through the sheet discharge port 11A onto the sheet discharge tray 13.

The sheet discharge tray 13 has a discharged-sheet receiving surface 13A for receiving thereon a sheet discharged through the sheet discharge port 11A. The discharged-sheet receiving surface 13A is inclined with respect to the horizontal plane so as to be lower in the vertical direction toward a charger 18B to be described later. That is, the discharged-sheet receiving surface 13A is sloped so as to become lower in the vertical direction toward the rear side. Thus, the rearmost end 13B of the discharged-sheet receiving surface 13A is also the lowest position in the discharged-sheet receiving surface 13A. The rearmost end 13B of the discharged-sheet receiving surface 13A will therefore be referred to also as a "rearmost and lowermost end 13B of the discharged-sheet receiving surface 13A" hereinafter.

A discharge roller 12 is provided in the sheet discharge port 11A. The discharge roller 12 can convey a sheet in a forward direction to discharge the sheet onto the discharged-sheet receiving surface 13A of the sheet discharge tray 13. The discharge roller 12 can be switched between: a mode of conveying a sheet in the forward direction (sheet discharge direction) to discharge a sheet toward the sheet discharge tray 13; and a mode of reversing the sheet conveying direction from the forward direction to a rearward direction and sending the sheet toward the image forming section 15 again.

The housing 11 includes a top cover 11B, a pair of side covers 11C (see FIG. 3), a front cover 11D, and a rear cover 11F which constitute the outer appearance design of the printer section 10. The top cover 11B covers an upper side surface of the printer section 10. More specifically, the top cover 11B extends from an upper rear end portion of the printer section 10 toward forward to a position that is immediately upward and forward of the discharge roller 12. Thus, the top cover 11B covers the discharge roller 12 from above. In other words, the top cover 11B covers an upper surface side of the discharge roller 12. The top cover 11B is integrally formed with a front extension part 11K that extends vertically downwardly from a front portion of the top cover 11B. The sheet discharge port 11A is formed in the front extension part 11K.

The side covers 11C cover right and left side surfaces of the printer section 10. The front cover 11D covers a front side surface of the printer section 10. The rear cover 11F covers a rear side surface of the printer section 10.

A manual feeding port 11E is formed in the front cover 11D. The manual feeding port 11E is an opening, through which a user can supply a sheet directly to the image forming section 15, without using a feeder mechanism 22 to be described later. When a user inserts a sheet into the manual feeding port 11E, an image is formed on the sheet by the image forming section 15.

An opening portion 11G is formed at a portion of the housing 11 that corresponds to the sheet discharge tray 13 and that faces upward. In the present embodiment, the opening portion 11G is formed in a region of the housing 11 above the entire part of a process unit 16 to be described later. However, the opening portion 11G may be formed at least in a region of the housing 11 above a developing unit 17 to be described later. The housing 11 is assembled with the opening/closing cover 14 configured to open or close the opening portion 11G.

More specifically, the opening/closing cover 14 is pivotally connected at its rear end to the front extension part 11K of the top cover 11B such that the opening/closing cover 14 can pivotally move about the rear end thereof. The opening/closing cover 14 is connected to the front extension part 11K via a hinge portion 14A. The opening/closing cover 14 can move between: a closed position where the opening/closing cover 14 closes the opening portion 11G; and an open position where the opening/closing cover 14 opens the opening portion 11G. The front end of the opening/closing cover 14 that is on the opposite side of the center of pivotal movement of the opening/closing cover 14 serve as a free end (distal end) of the opening/closing cover 14.

An upper surface of the opening/closing cover 14 constitutes at least part of the discharged-sheet receiving surface 13A such that the rearmost end of the opening/closing cover 14 serves as the rearmost and lowermost end 13B of the discharged-sheet receiving surface 13A. In other words, the hinge portion 14A is located at the rearmost and lowermost end 13B of the discharged-sheet receiving surface 13A of the sheet discharge tray 13 (opening/closing cover 14).

The image forming section 15 is of an electro-photographic type and is configured to form an image on a sheet by transferring developer onto the sheet. The image forming section 15 includes: the process unit 16, an exposure device 19, a transfer portion 20, and a fixing device 21. The process unit 16 is detachably mounted in the apparatus body of the printer section 10 through the opening portion 11G. A developing unit 17 constituting the process unit 16 (to be described later) is also detachable from the apparatus body of the printer section 10 through the opening portion 11G.

The process unit 16 includes: the developing unit 17; and the drum unit 18 having a support body 16A. The developing unit 17 is detachably attached to the support body 16A. Thus, the developing unit 17 is detachably integrated with the drum unit 18 via the support body 16A.

The developing unit 17 includes: a developing device 17A; and a developer chamber 17B. The drum unit 18 includes: the photosensitive drum 18A; and the charger 18B. The developing device 17A supplies developer accommodated in the developer chamber 17B to the photosensitive drum 18A. The developing device 17A includes: a developing roller 17C; and a supply roller 17D. The charger 18B includes: a charge wire 18C; and an electrode member 18D provided surrounding the charge wire 18C.

In other words, the process unit 16 includes: the photosensitive drum 18A; the charger 18B; the developing device 17A; and the developer chamber 17B. With this configuration, when the opening/closing cover 14 is opened, the process unit 16 becomes attachable to or detachable from the apparatus body through the opening portion 11G, and the developing unit 17 becomes attachable to or detachable from the support body 16A of the drum unit 18 through the opening portion 11G.

The photosensitive drum 18A is a photosensitive body configured to bear a developer image thereon. The charger 18B charges the photosensitive drum 18A. The exposure device 19 exposes the charged photosensitive drum 18A to light, as a result of which an electrostatic latent image is formed on the photosensitive drum 18A. In this example, the exposure device 19 scans a light beam on the photosensitive drum 18A.

A developer image is formed on the photosensitive drum 18A when developer is supplied to the photosensitive drum 18A on which the electrostatic latent image has been formed. The transfer portion 20 is disposed at a position confronting the photosensitive drum 18A. The transfer portion 20 transfers the developer image from the photosensitive drum 18A onto a sheet.

The fixing device 21 directly or indirectly heats developer that has been transferred on the sheet, thereby fixing the developer onto the sheet.

The fixing device 21 includes a heating body 21A and a pressing body 21B. The heating body 21A heats the developer transferred on the sheet. The pressing body 21B presses the sheet against the heating body 21A. The heating body 21A is disposed at a vertical level that is higher than the photosensitive drum 18A and lower than the discharge roller 12.

Both of the heating body 21A and pressing body 21B are roller-shaped. The heating body 21A has a cylindrical member which is formed of metal and in which a heater is disposed. An outer peripheral portion of the roller-shaped pressing body 21B is formed of an elastically-deformable material such as rubber.

The image forming section 15 further includes a pair of registration rollers 15B and a pair of conveying rollers 15A. The pair of registration rollers 15B serves as an inlet port of the image forming section 15. The registration rollers 15B corrects skew of a sheet, before supplying the sheet to the position between the photosensitive drum 18A and the transfer portion 20. The pair of conveying rollers 15A serves as an outlet port of the image forming section 15. The pair of conveying rollers 15A sends, in a direction toward upward and rearward, a sheet that has been discharged out of the fixing device 21.

The rearmost and lowermost end 13B of the discharged-sheet receiving surface 13A is positioned at a vertical level lower than an upper end of the charger 18B. The upper end of the charger 18B is a topmost end of the electrode member 18D. The charger 18B is located at a side opposite to the developing device 17A with respect to the rearmost and lowermost end 13B of the discharged-sheet receiving surface 13A.

The exposure device 19 and process unit 16 are disposed below the opening/closing cover 14 and are arranged in this order from the front side. Specifically, the exposure device 19, developer chamber 17B, developing device 17A, photosensitive drum 18A, and fixing device 21 are arranged in this order from the front side to the rear side.

A sheet supply tray 25 is detachably mounted in the apparatus body at a position below the image forming section 15. Sheets to be supplied to the image forming section 15 are accommodated in the sheet supply tray 25. The feeder mechanism 22 is provided in the apparatus body to feed the sheets one by one from the sheet supply tray 25 toward the image forming section 15.

A pair of conveying rollers 26 is provided in the apparatus body for conveying a sheet that has been fed by the feeder mechanism 22. The conveying rollers 26 also convey a sheet when the sheet is inserted in the manual feeding port 11E.

A first conveying path L0 is defined in the apparatus body of the printer section 10 to extend from the sheet supply tray 25 through the feeder mechanism 22 and the image forming section 15 and to finally reach the sheet discharge tray 13. Now assume that the first conveying path L0 is projected to a virtual vertical plane that is parallel to the sheet discharge direction (forward direction), in which the discharge roller 12 discharges a sheet toward the sheet discharge tray 13. In such a case, as shown in FIG. 1, the first conveying path L0 has an S-shape having a first curved portion L01 and a second curved portion L02. The first curved portion L01 is located below the exposure device 19. The first curved portion L01 is located at a position downstream of the sheet supply tray 25 and upstream of the inlet port of the image forming section 15 (registration rollers 15B) in a sheet conveying direction along the first conveying path L0. The second curved portion L02 is located downstream of the outlet port of the image forming section 15 (conveying rollers 15A) and upstream of the discharge roller 12 in the sheet conveying direction along the first conveying path L0.

A sheet is conveyed along the S-shaped first conveying path L0 as described below.

First, a sheet is fed by the feeder mechanism 22 from the sheet supply tray 25 toward forward and upward. The sheet is then turned toward rearward by the first curved portion L01. The first curved portion L01 is defined by a guide wall provided in the apparatus body in this example. The sheet is then conveyed by the pair of conveying rollers 26. The sheet enters the image forming section 15 through between the pair of registration rollers 15B (inlet port of the image forming section 15), while being corrected in skew. In the image forming section 15, an image is formed and fixed on a surface of the sheet that faces upward. The sheet is further conveyed by the pair of conveying rollers 15A, while passing through between the pair of conveying rollers 15A (outlet port of the image forming section 15). The sheet is then turned toward forward by the second curved portion L02. The second curved portion L02 is defined by a front surface 27F of a switching guide portion 27 (to be described later with reference to FIG. 8). The sheet is then conveyed forward, while being guided by a guide portion 11H which is integrally formed with the top cover 11B. The sheet is further conveyed by the discharge roller 12 toward forward, thereby being discharged through the sheet discharge port 11A onto the sheet discharge tray 13.

Thus, by conveying a sheet along the second curved portion L02, the sheet is turned around after the sheet is formed with an image by the image forming section 15 and before the sheet is discharged out of the image forming apparatus 1. In other words, the orientation of a sheet is changed after the sheet is formed with an image and before the sheet is discharged out of the image forming apparatus 1. This sheet discharge process will be referred to as a "non-straight discharge" hereinafter.

When a sheet is supplied through the manual feeding port 11E, the sheet enters the first conveying path L0 at a position below the exposure device 19, and is conveyed by the pair of conveying rollers 26 to the image forming section 15.

A re-conveying path L1 is further provided in the apparatus body. The re-conveying path L1 is used during a duplex printing process for forming images on both of a pair of opposite surfaces of a sheet. More specifically, the re-conveying path L1 is configured to convey a sheet, which has been formed with an image by the image forming section 15, again to the image forming section 15. During the duplex printing, the image forming section 15 first forms an image on one surface of a sheet and the discharge roller 12 conveys the sheet in the sheet discharge direction (forward direction). The discharge roller 12 then reverses the sheet conveying direction to start conveying the sheet toward rearward to feed the sheet to the re-conveying path L1. As a result, the sheet is conveyed along the re-conveying path L1 toward the image forming section 15. When the sheet reaches the image forming section 15, the image forming section 15 forms an image on the other surface of the sheet.

The re-conveying path L1 includes: a first re-conveying part L11, a second re-conveying part L12, and a third re-conveying part L13. The first re-conveying part L11 is a path that extends vertically downwardly at a position rearward of the fixing device 21, turns toward forward, and then extends forward to reach a position below the process unit 16. The second re-conveying part L12 is a path that extends forward from the position below the process unit 16 toward a position below the exposure device 19. The third re-conveying part L13 is a path that turns toward upward from the second re-conveying part L12 and then extends rearward toward the inlet port of the image forming section 15 (registration rollers 15B). Thus, the re-conveying path L1 passes through a position below the exposure device 19.

3. Straight Discharge (Second Conveying Path)

As shown in FIG. 1, a pivot plate 23 is pivotally assembled to the apparatus body at its upper and rear portion. As illustrated in FIG. 8, an opening 11J is formed in an upper and rear portion of the housing 11. As illustrated in FIGS. 3 and 8, the pivot plate 23 partially protrudes outside the housing 11 through the opening 11J. Thus, the pivot plate 23 is partially exposed outside the housing 11.

The pivot plate 23 can be pivotally moved relative to the apparatus body between: an open position (shown in FIG. 4) where the pivot plate 23 forms a second conveying path L2; and a closed position (shown in FIG. 1) where the pivot plate 23 closes the second conveying path L2. A center axis O1 of pivotal movement of the pivot plate 23 is fixed relative to the apparatus body at a position that is between the first conveying path L0 and the re-conveying path L1 and that is at a vertical level lower than both of the scanner hinge portion 51 and the cover hinge portion 57.

Figure 7:
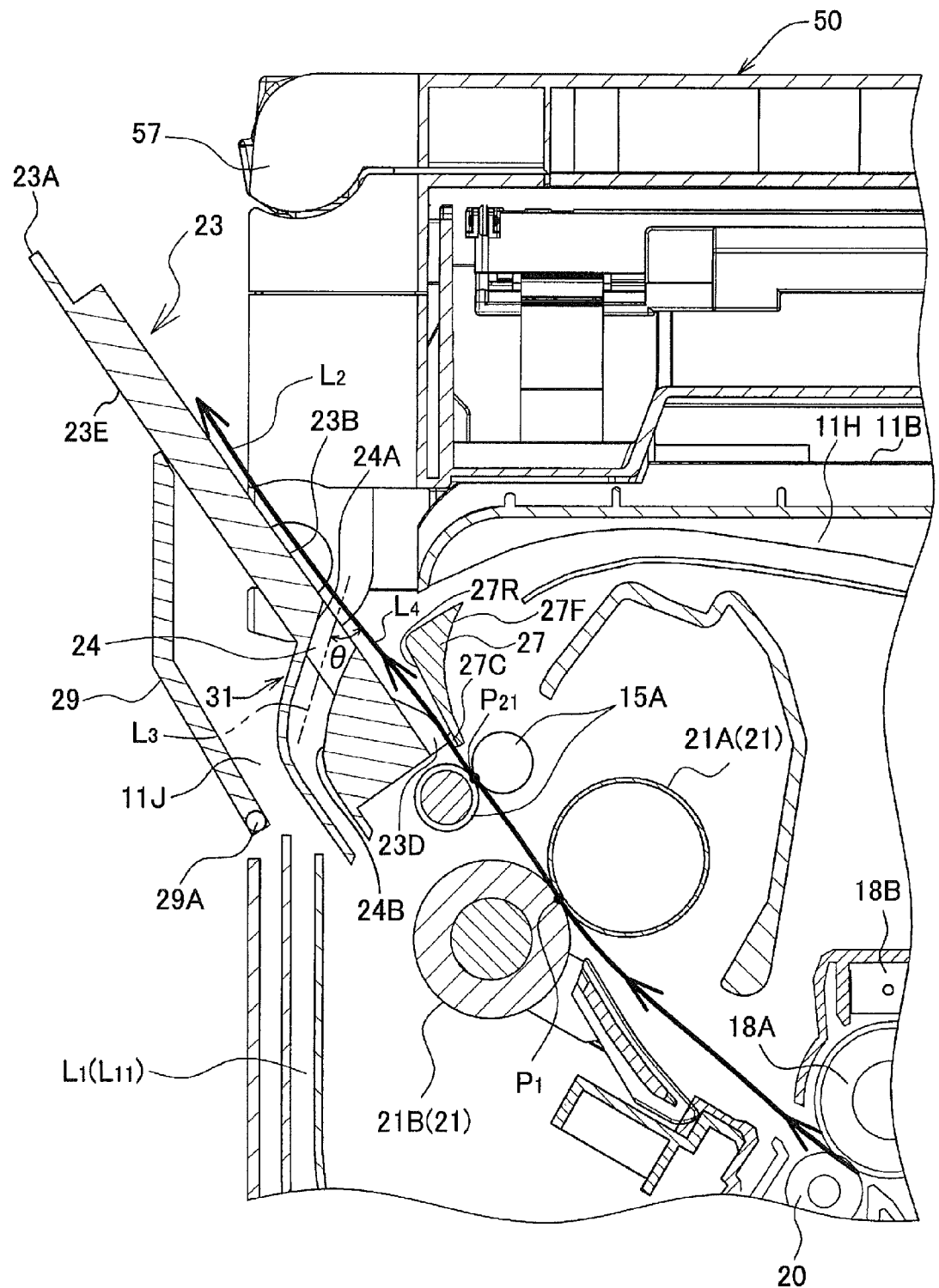
FIG. 7 is an enlarged cross-sectional view of part of the image forming apparatus around a pivot plate when the printer section is performing the straight discharge.

As illustrated in FIG. 4, the second conveying path L2 is a straight path. A sheet, which has been conveyed from the image forming section 15, can be guided along the second conveying path L2 to the outside of the housing 11 through the opening 11J. As shown in FIG. 7, a sheet is conveyed along the second conveying path L2 from the image forming section 15 substantially linearly in a sheet conveying direction L4. The sheet conveying direction L4 is substantially aligned with a virtual line that passes through both of: a nip point P1 between the heating body 21A and the pressing body 21B; and a nip point P2 between the pair of conveying rollers 15A.

Thus, by conveying a sheet along the second conveying path L2, the sheet is not turned around after the sheet is formed with an image and before the sheet is discharged outside the image forming apparatus 1. In other words, the orientation of a sheet is not changed after the sheet is formed with an image and before the sheet is discharged outside the image forming apparatus 1. This sheet discharge process will be referred to as a "straight discharge" hereinafter.

Figure 5:
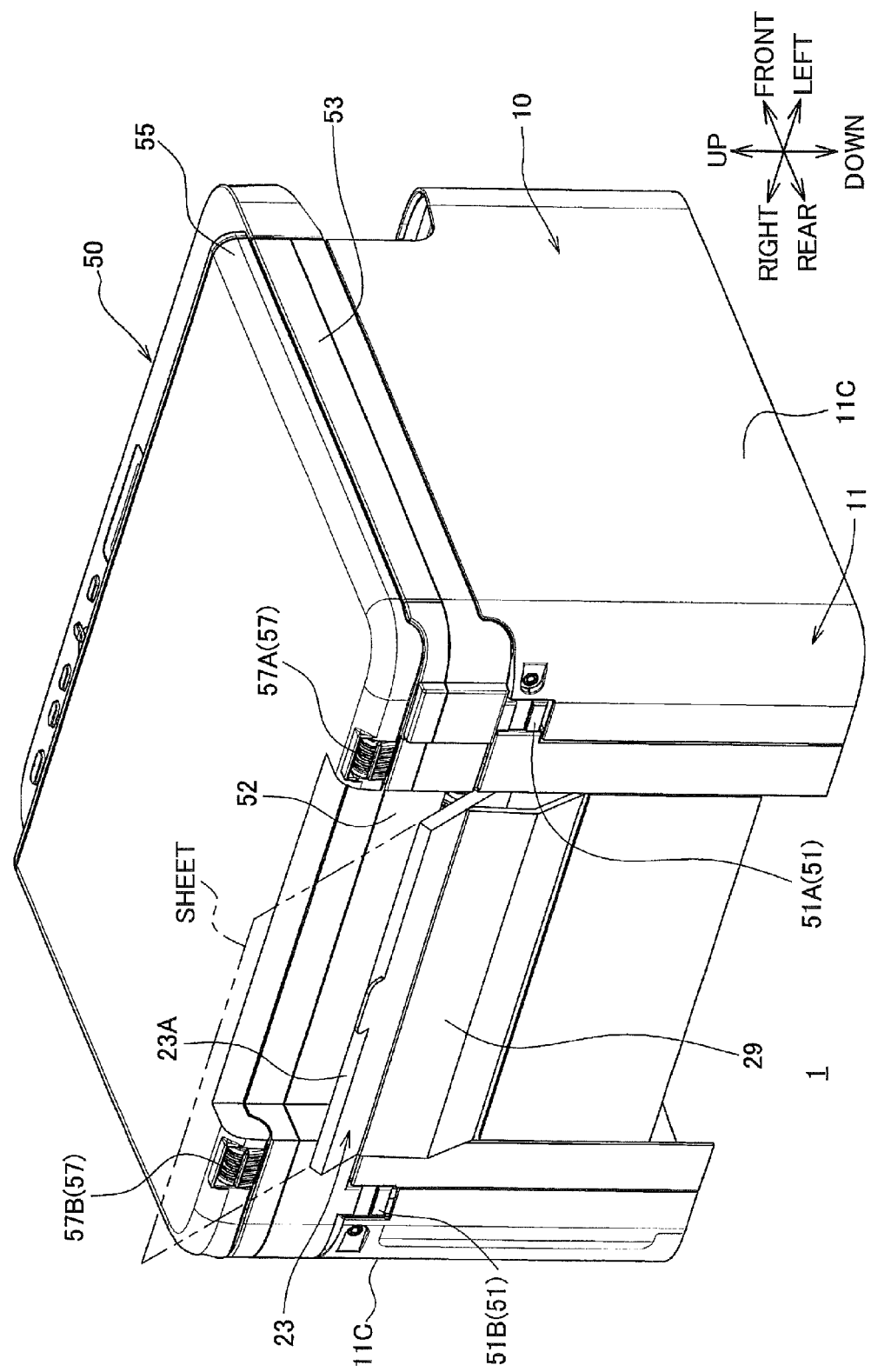
FIG. 5 is a perspective view of the image forming apparatus as viewed from the left-rear side, showing how the printer section performs the straight discharge.

As illustrated in FIGS. 3 and 5, the pivot plate 23 is a plate-shaped member that is elongated in the width direction between a left side of the housing 11 where the first cover hinge 57A and first scanner hinge 51A are provided and a right side of the housing 11 where the second cover hinge 57B and second scanner hinge 51B are provided.

The pivot plate 23 is pivotally assembled to the frame of the apparatus body via a pair of shaft portions 23C, one of which is shown in FIGS. 10A-11B. The shaft portions 23C are provided on a lower end portion of the pivot plate 23 at widthwise outer ends thereof. The pair of shaft portions 23C are rotatably supported by the frame of the apparatus body. The rotational axes of the pair of shaft portions 23C serve as the center axis O1 of pivotal movement of the pivot plate 23.

An upper end 23A of the pivot plate 23 is on the opposite side of the lower end portion of the pivot plate 23 where the center axis O1 of pivotal movement of the pivot plate 23 is located. The upper end 23A therefore serves as a free end (distal end) of the pivot plate 23. The upper end 23A will therefore be referred to also as a "free end 23A" hereinafter.

As illustrated in FIG. 1, when the pivot plate 23 is closed, the free end 23A of the pivot plate 23 is positioned at a vertical level higher than: the top cover 11B; the scanner hinge portion 51; and the lower end LE of the scanner section 50 (shown in FIG. 4).

Further, as illustrated in FIG. 6, the entire width of the free end 23A of the pivot plate 23 in the width direction can be displaced in both of: the space defined between the third virtual vertical plane S3 and the fourth virtual vertical plane S4; and the space defined between the first virtual vertical plane S1 and the second virtual vertical plane S2. The pivot plate 23 can therefore be pivotally moved in the space between the first and second scanner hinges 51A and 51B and in the space between the first and second cover hinges 57A and 57B.

As illustrated in FIG. 6, in this example, the cover hinge 57A is disposed inward from the scanner hinge 51A in the width direction, and the cover hinge 57B is disposed inward from the scanner hinge 51B in the width direction. However, the cover hinge 57A may be disposed at least partially outward from the scanner hinge 51A in the width direction, and the cover hinge 57B may be disposed at least partially outward from the scanner hinge 51B in the width direction. Even in such cases, the pivot plate 23 is preferably arranged such that the entire width of the free end 23A of the pivot plate 23 can be displaced in both of: the space defined between the third virtual vertical plane S3 and the fourth virtual vertical plane S4; and the space defined between the first virtual vertical plane S1 and the second virtual vertical plane S2.

Figure 10A:
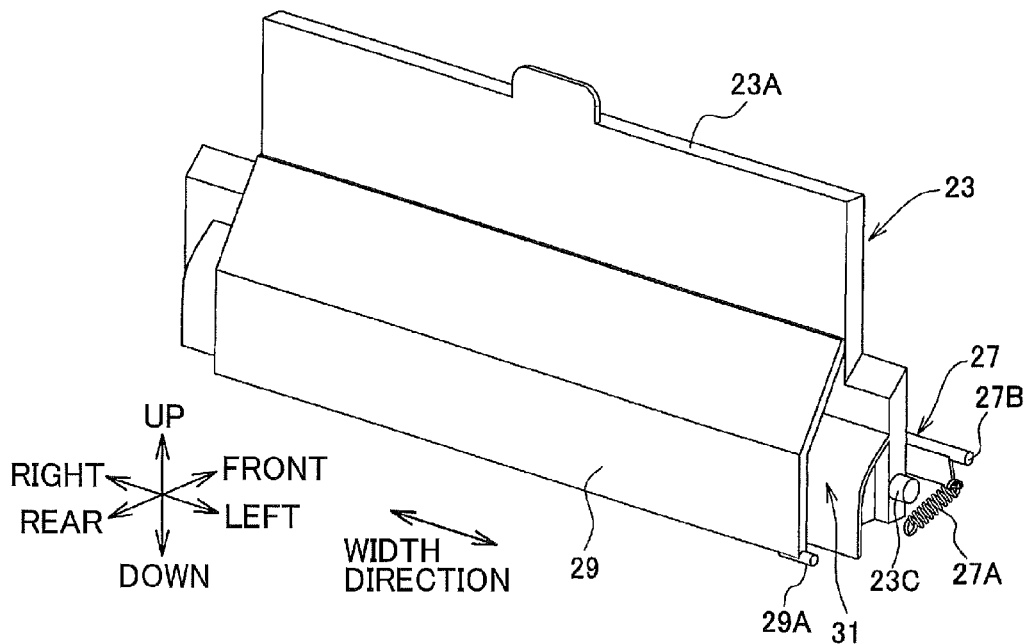
Figure 10B:
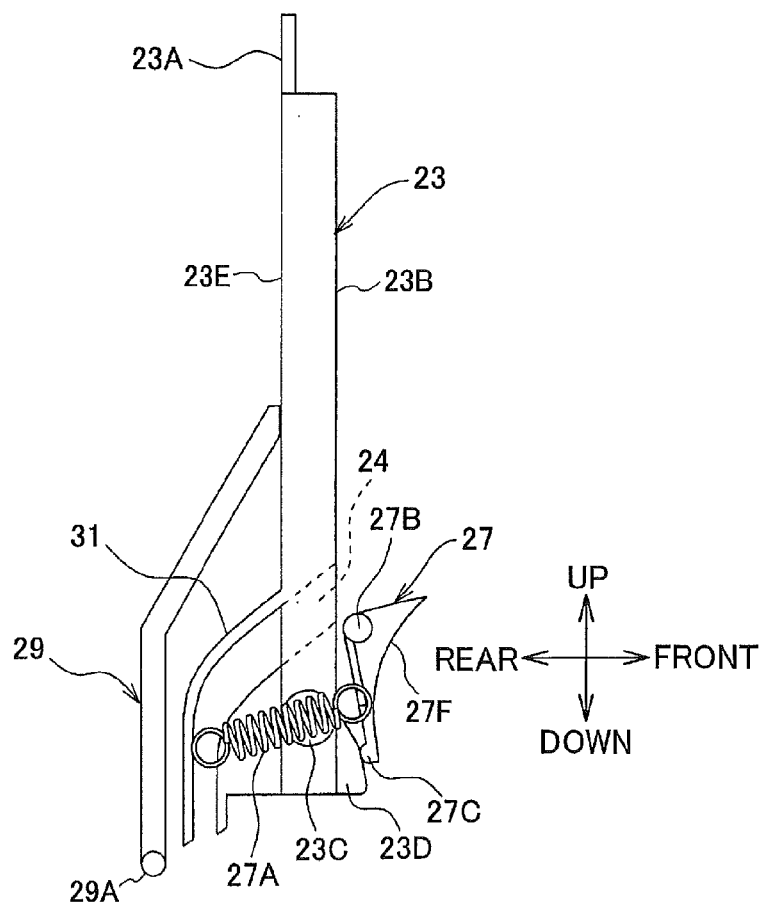
Figure 11A:
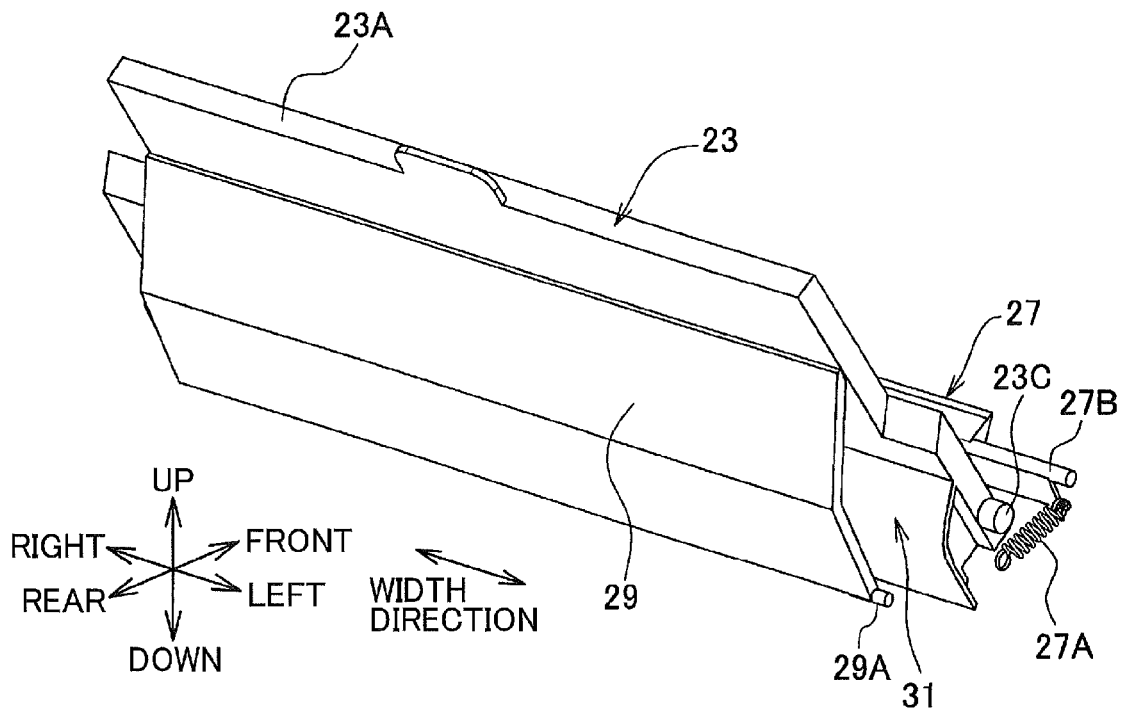
Figure 11B:
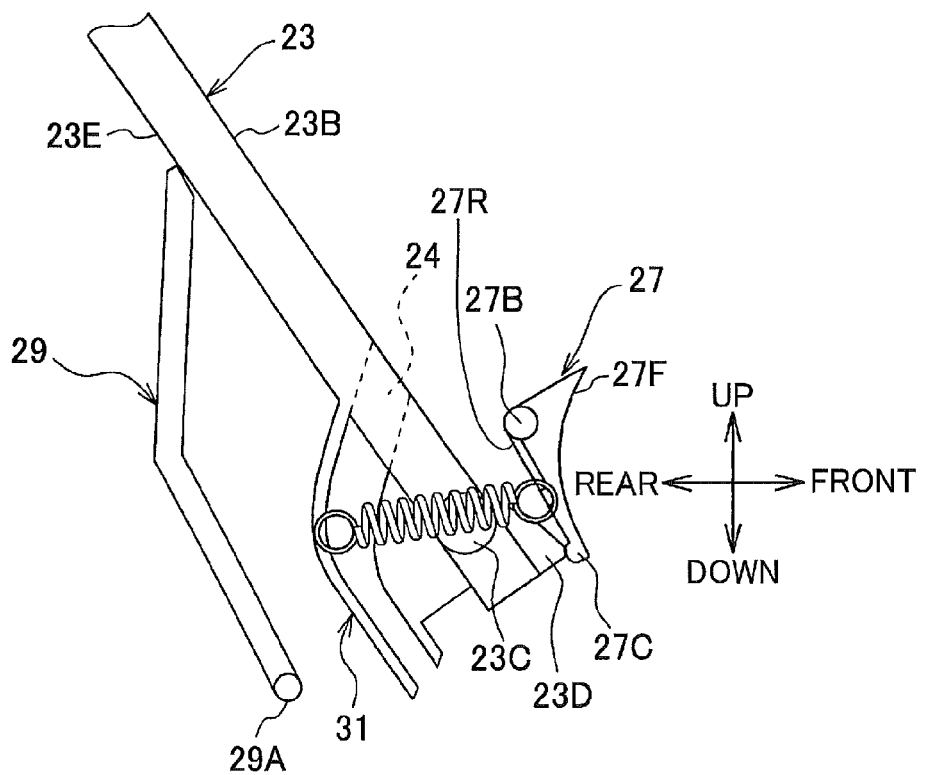

As shown in FIG. 7, the pivot plate 23 has a front surface 23B and a rear surface 23E opposite to each other. When the pivot plate 23 is closed, as shown in FIGS. 8 and 10A-10B, the front surface 23B faces forward, and the rear surface 23E faces rearward. When the pivot plate 23 is opened, as shown in FIGS. 7 and 11A-11B, the front surface 23B faces obliquely forward and upward, and the rear surface 23E faces obliquely rearward and downward. As illustrated in FIG. 7, when the pivot plate 23 is at the open position, a sheet is conveyed along the second conveying path L2 in the sheet conveying direction L4, while contacting the front surface 23B of the pivot plate 23. The sheet is finally placed rest on the front surface 23B of the pivot plate 23 so that a user can pick up the sheet from the pivot plate 23. In other words, when a sheet having an image formed thereon is discharged linearly along the second conveying path L2 in the sheet conveying direction L4, the sheet is discharged onto the front surface 23B of the pivot plate 23 and placed on the front surface 23B.

A penetrating portion 24 is formed in the pivot plate 23. The penetrating portion 24 is a through-hole penetrating the pivot plate 23 through the entire thickness of the pivot plate 23 between the front surface 23B and the rear surface 23E so that the penetrating portion 24 is opened on both of the front surface 23B and the rear surface 23E. As illustrated in FIG. 8, the penetrating portion 24 constitutes part of the re-conveying path L1 when the pivot plate 23 is situated at the closed position.

As illustrated in FIGS. 8 and 10A-11B, the pivot plate 23 is integrally formed with a path guide portion 31 on the rear surface 23E. The path guide portion 31 constitutes part of the re-conveying path L1 and connects the penetrating portion 24 to the first re-conveying part L11. Thus, as being part of the pivot plate 23, the path guide portion 31 pivotally moves about the center O1 of pivotal movement of the pivot plate 23.

As shown in FIG. 7, the penetrating portion 24 is defined by a pair of inner wall surfaces 24A and 24B that extend between the front surface 23B and the rear surface 23E and that are disposed confronting each other in the sheet conveying direction L4 in which a sheet is conveyed along the front surface 23B. The pair of inner wall surfaces 24A and 24B includes: a downstream side inner wall surface 24A and an upstream side inner wall surface 24B. The downstream side inner wall surface 24A is disposed on a downstream side relative to the upstream side inner wall surface 24B in the sheet conveying direction L4. The downstream side inner wall surface 24A is inclined with respect to the sheet conveying direction L4 such that the downstream side inner wall surface 24A slopes downstream in the sheet conveying direction L4, while proceeding from the rear surface 23E toward the front surface 23B.

More specifically, as illustrated in FIG. 7, an acute angle θ is formed between: a virtual line L3 that is parallel to both of the downstream side inner wall surface 24A and the virtual vertical plane; and a virtual line that extends parallel to the sheet conveying direction L4 of the second conveying path L2.

The switching guide portion 27 is pivotally assembled to the apparatus body at a position in front of the pivot plate 23 as shown in FIGS. 7, 8, and 10A-11B. As shown in the enlarged cross-sectional view of FIGS. 7 and 8, the switching guide portion 27 has: the front surface 27F that faces forward; and a rear surface 27R that faces rearward. The front surface 27F is curved-shaped, and the rear surface 27R is straight-shaped. The switching guide portion 27 can guide a sheet, which has been conveyed from the image forming section 15, along either one of the first conveying path L0 and the second conveying path L2. More specifically, the switching guide portion 27 is capable of switching between: a position or posture at which the switching guide portion 27 guides a sheet along its front surface 27F, thereby guiding the sheet along the second curved path L02 in the first conveying path L0 (see FIG. 8); and a position or posture at which the switching guide portion 27 guides a sheet along its rear surface 27R, thereby guiding the sheet along the second conveying path L2 (see FIG. 7).

The switching guide portion 27 is a component separate from the pivot plate 23. The switching guide portion 27 is mechanically interlocked with the pivotal movement of the pivot plate 23 via an interlocking portion 27A. That is, when the pivot plate 23 is at the closed position, the interlocking portion 27A causes the switching guide portion 27 to be situated at the position to guide a sheet on the front side along the second curved path L02 of the first conveying path L0 (see FIG. 8). When the pivot plate 23 is at the open position, the interlocking portion 27A causes the switching guide portion 27 to be situated at the position to guide a sheet on the rear side along the second conveying path L2 (see FIG. 7). The interlocking portion 27A will be described later with reference to FIGS. 10A-11B.

As shown in FIG. 1, a pivot cover 29 is pivotally assembled to the housing 11 at a position rearward of the pivot plate 23. Thus, the pivot cover 29 is disposed at the open position side (outer side) relative to the pivot plate 23 situated at the closed position. As illustrated in FIG. 8, the pivot cover 29 is configured to close the opening 11J when the pivot plate 23 is closed.

More specifically, the pivot cover 29 is pivotally assembled to the housing 11 via a pair of shaft portions 29A. The pair of shaft portions 29A is provided on a lower end of the pivot cover 29 at its widthwise outer ends. One of the pair of shaft portions 29A is shown in FIGS. 10A-11B. Although not shown, a pair of springs is provided to urge the pivot cover 29 in a direction to close the opening 11J. The pair of springs are connected between the pair of widthwise outer ends of the pivot cover 29 and the apparatus body. It is noted that only one spring may be provided, in place of the pair of springs.

With this arrangement, when the pivot plate 23 is pivotally moved from the closed position to the open position, as shown in FIGS. 7, 11A, and 11B, the pivot plate 23 presses the pivot cover 29 so that the pivot cover 29 pivotally moves in the same direction as the pivot plate 23 does. At this time, the springs (not shown) are resiliently deformed to apply the resilient force to the pivot cover 29.

When the pivot plate 23 is pivotally moved from the open position back to the closed position as shown in FIGS. 8, 10A, and 10B, the force that has pressed the pivot cover 29 in the direction to open the opening 11J becomes vanished. As a result, the pivot cover 29 pivotally moves in a direction to close the opening 11J due to the resilient force of the springs (not shown). Thus, the pivot cover 29 pivotally moves in a mechanically interlocked relationship with the pivot plate 23.

As shown in FIG. 8, in the state where the pivot plate 23 is at the closed position, when the pivot plate 23 and the scanner section 50 are projected onto a virtual vertical plane S5 that is parallel to the center axis O2 of pivotal movement of the scanner section 50, the scanner section 50 and part of the pivot plate 23 overlap with each other.

With this arrangement, as illustrated in FIGS. 2 and 9, when the scanner section 50 is pivotally moved away from the sheet discharge tray 13, a rear wall 52 of the scanner section 50 is brought into abutment contact with the pivot plate 23 at the closed position, and presses the pivot plate 23 so that the pivot plate 23 pivotally moves together with the scanner section 50.

As illustrated in FIG. 8, when the scanner section 50 and the re-conveying path L1 are projected onto a virtual horizontal plane S6, at least part of the re-conveying path L1 (the first re-conveying part L11, in this example) does not overlap with the movable range of the reading element in the scanner section 50. More specifically, the first re-conveying part L11 is disposed rearward from the rear end RE of the movable range, in which the reading element is movable by the scan-ning mechanism within the scanner section 50. The first re-conveying part L11 is therefore disposed out of the movable range of the reading element in the scanner section 50.

4. Mechanism Interlocking Switching Guide Portion with Pivot Plate

As shown in FIGS. 10A and 10B, the switching guide portion 27 is pivotally assembled to the apparatus body via a shaft portion 27B. The shaft portion 27B is rotatably supported by the frame of the apparatus body at a position that is shifted from the shaft portions 23C in a direction toward the first conveying path L0.

As described already, the switching guide portion 27 is interlocked with the pivotal movement of the pivot plate 23 via the interlocking portion 27A. In this example, the interlocking portion 27A is a pair of coil springs, one of which is shown in FIGS. 10A-11B. The interlocking portion 27A will therefore be referred to also as a pair of coil springs 27A hereinafter. The pair of coil springs 27A are connected between the pair of widthwise outer ends of the switching guide portion 27 and the apparatus body such that the front ends of the coil springs 27A are connected to the switching guide portion 27, and the rear ends of the coil springs 27A are connected to the apparatus body. It is noted that the interlocking portion 27A may be configured from a single coil spring 27A, rather than the pair of coil springs.

A pair of protrusions 23D is provided on a pair of widthwise outer ends of the pivot plate 23, although only one of the pair is illustrated in FIGS. 10B and 11B. The protrusions 23D protrude from the front surface 23B of the pivot plate 23 in a direction toward the switching guide portion 27. A pair of abutting portions 27C is provided on the rear surface 27R of the switching guide portion 27 at positions confronting the protrusions 23D.

The coil springs 27A apply the switching guide portion 27 with a resilient force in a direction to cause the abutting portions 27C to contact the protrusions 23D, respectively. The coil springs 27A therefore causes the abutting portions 27C and the protrusions 23D to maintain contact with each other.

With this arrangement, in the state where the abutting portions 27C are in contact with the protrusions 23D, a gap or space is formed between: the front surface 23B of the pivot plate 23 at its widthwise inner region defined between the protrusions 23D; and the rear surface 27R of the switching guide portion 27 at its widthwise inner region defined between the abutting portions 27C. The gap constitutes the second conveying path L2, through which a sheet is conveyed.

With the above-described arrangement, the switching guide portion 27 pivotally moves in a mechanically interlocked manner with the pivotal movement of the pivot plate 23 as illustrated in FIGS. 10B and 11B.

More specifically, when the pivot plate 23 is moved to the open position, as illustrated in FIG. 11B, the protrusions 23D press the switching guide portion 27 so that the switching guide portion 27 pivotally moves about the shaft portion 27B in a counterclockwise direction as shown in FIG. 11B, while increasing a resiliently deformed amount of the coil springs 27A. In this way, the switching guide portion 27 moves to the position or posture at which the switching guide portion 27 guides a sheet from the image forming section 15 along the rear surface 27R, that is, along the second conveying path L2.

When the pivot plate 23 is moved back to the closed position, as shown in FIG. 10B, the coil springs 27A pull the switching guide portion 27 so that the switching guide portion 27 pivotally moves about the shaft portion 27B in a clockwise direction in FIG. 10B, while maintaining the contact state between the abutting portions 27C and the protrusions 23D. In this way, the switching guide portion 27 moves back to the position or posture at which the switching guide portion 27 guides a sheet along the front surface 27F of the switching guide portion 27. At this time, the switching guide portion 27 guides a sheet along the second curved portion L02 of the first conveying path L0.

5. Advantages of Image Forming Apparatus According to the Embodiment

When desiring to perform a straight discharge operation, a user moves the pivot plate 23 to the open position. When desiring to perform a duplex printing, a user moves the pivot plate 23 to the closed position. While a sheet is conveyed along the re-conveying path L1, the sheet passes through the penetrating portion 24 formed in the pivot plate 23 and is conveyed again to the image forming section 15. Because the pivot plate 23 has a simple configuration, the entire image forming apparatus 1 can be made compact. By using the pivot plate 23, the image forming apparatus 1 can attain both of the straight discharge process and the duplex printing process employing the non-straight discharge process.

When the pivot plate 23 is at the closed position, the free end 23A of the pivot plate 23 is positioned at a vertical level higher than the scanner hinge portion 51. Accordingly, the user can easily confirm the pivot plate 23 visually. Operability of the image forming apparatus 1 is enhanced.

When the pivot plate 23 is at the closed position, the free end 23A of the pivot plate 23 is positioned at a vertical level higher than the lower end LE of the scanner section 50. Accordingly, the user can easily confirm the pivot plate 23 visually. Operability of the image forming apparatus 1 is enhanced.

In the present embodiment, in a state where the pivot plate 23 is at the closed position, the scanner section 50 overlaps part of the pivot plate 23 when the scanner section 50 and the pivot plate 23 are projected to the virtual vertical plane S5. This arrangement can prevent an increase in the size of the image forming apparatus 1 even though the image forming apparatus 1 is provided with the scanner section 50.

In the present embodiment, the downstream side inner wall surface 24A of the penetrating portion 24 is inclined with respect to the sheet conveying direction L4 such that the downstream side inner wall surface 24A slopes downstream in the sheet conveying direction L4 while proceeding toward the front surface 23B. This arrangement can prevent a leading end of a sheet, which is being conveyed along the second conveying path L2, from entering the penetrating portion 24.

That is, an acute angle θ is formed between: the virtual line L3 that is parallel to the downstream side inner wall surface 24A and the virtual vertical plane; and a virtual line that extends parallel to the sheet conveying direction L4 of the second conveying path L2. This arrangement can properly guide a sheet, whose leading end has inadvertently collided with the downstream side inner wall surface 24A of the penetrating portion 24, back to the front surface 23B side. Thus, the leading end of the sheet can be prevented from getting caught in the penetrating portion 24.

The sheet is heated by the fixing device 21 and is therefore likely to be curled along the curved surface of the heating body 21A. According to the present embodiment, the penetrating portion 24 is positioned on a side opposite to the heating body 21A with respect to the second conveying path L2. With this arrangement, even though the sheet is curled along the curved surface of the heating body 21A, the leading end of the sheet is directed to an opposite side of the penetrating portion 24. This prevents the leading end of the sheet from getting caught in the penetrating portion 24.

When the pivot plate 23 is situated at the closed position, the free end 23A of the pivot plate 23 is positioned at a vertical level higher than the top cover 11B. The user can easily hold the pivot plate 23. Operability of the image forming apparatus 1 is improved.

The image forming apparatus 1 is especially effective in forming an image on a thick sheet such as an envelope. For example, when a user desires to form an image on an envelope, the user supplies the envelope in the image forming apparatus 1 through the manual feeding port 11E and displaces the pivot plate 23 to the open position. As a result, the envelope is discharged onto the pivot plate 23 through the straight discharge, after having been formed with an image.

Because the pivot plate 23 is partially exposed outside of the housing 11 through the opening 11J, the user can easily hold and operate the pivot plate 23, while inserting the envelope into the manual feeding port 11E. When the envelope is discharged onto the pivot plate 23, the user can easily confirm the envelope visually, especially in the case where the leading end of the envelope reaches a vertical level higher than the scanner section 50 as illustrated in FIGS. 4 and 5.

The pivot cover 29 closes the opening 11J when the pivot plate 23 is at the closed position. The pivot cover 29 can prevent dust and the like from entering the housing 11 through the opening 11J.

(Second Embodiment)

Figure 12A:
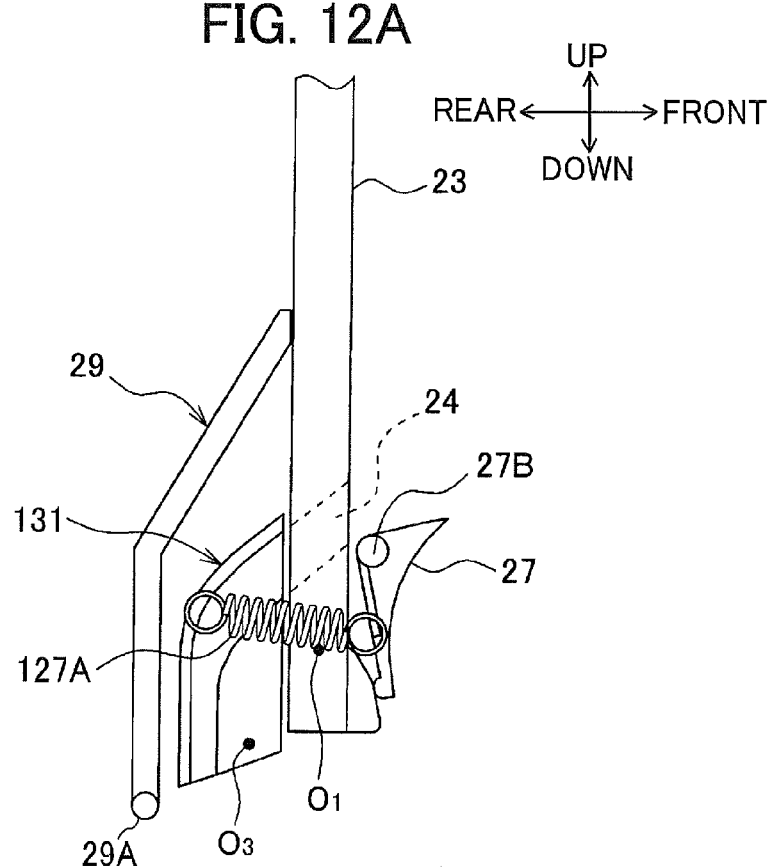
FIG. 12A is a left side view illustrating how the pivot plate and a path guide portion are situated during the non-straight discharge, according to a second embodiment.

In the above-described first embodiment, the path guide portion 31 is integrated with the pivot plate 23. On the other hand, in a second embodiment, as illustrated in FIG. 12A, a path guide portion 131 is provided as a component separate from the pivot plate 23. The path guide portion 131 is configured to pivotally move about a center axis O3 of pivotal movement relative to the apparatus body. The center axis O3 of pivotal movement is fixed relative to the apparatus body at a position that is rearward and downward from the center axis O1 of pivotal movement of the pivot plate 23. In other words, the center axis O3 of pivotal movement of the path guide portion 131 is located at a position that is shifted from the pivotal movement center axis O1 of the pivot plate 23 in a direction toward the re-conveying path L1 and that is at a vertical level lower than the pivotal movement center axis O1. The path guide portion 131 is mechanically interlocked with the pivotal movement of the pivot plate 23 via an interlocking portion 127A as shown in FIGS. 12A and 12B.

Figure 12B:
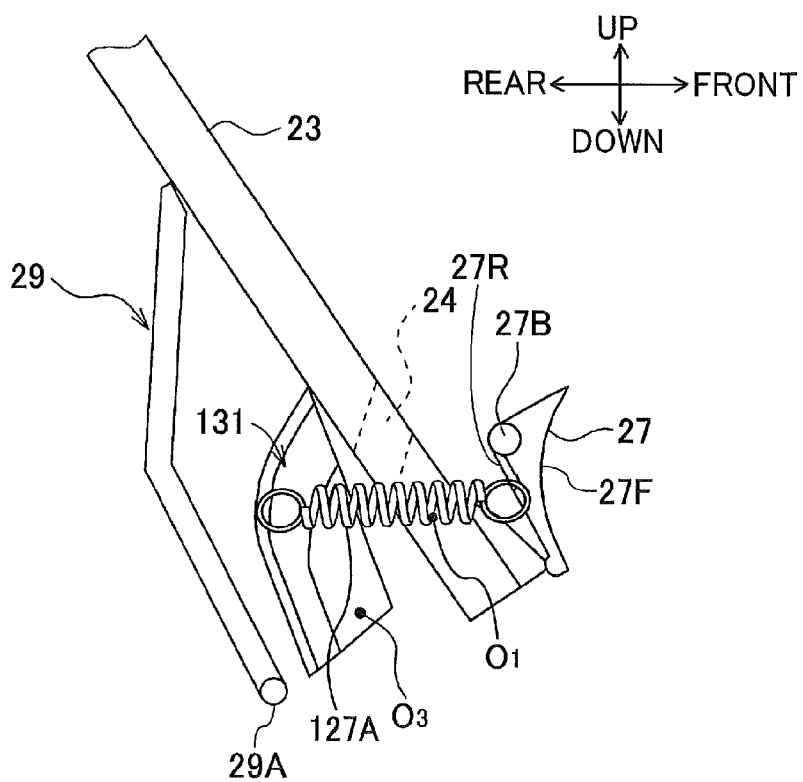
FIG. 12B is a left side view illustrating how the pivot plate and the path guide portion are situated during the straight discharge according to the second embodiment.

The interlocking portion 127A is a pair of coil springs, one of which is shown in FIGS. 12A-12B. The interlocking portion 127A will therefore be referred to also as a pair of coil springs 127A hereinafter. The pair of coil springs 127A are connected between the pair of widthwise outer ends of the switching guide portion 27 and a pair of widthwise outer ends of the path guide portion 131 such that front ends of the coil springs 127A are connected to the switching guide portion 27, and the rear ends of the coil springs 127A are connected to the path guide portion 131. In the present embodiment, in place of the coil springs, link bars formed of rigid bodies may be used as the interlocking portion 127A. It is noted that a single coil spring or a single link bar may be employed as the interlocking portion 127A.

With this arrangement, when the pivot plate 23 is pivotally moved toward the open position, as shown in FIG. 12B, the path guide portion 131 is pressed by an upper portion of the pivot plate 23 relative to the pivotal center axis O1. As a result, the path guide portion 131 pivotally moves about the center axis O3 of pivotal movement in a counterclockwise direction in FIG. 12B, that is, in a direction toward the side of the open position of the pivot plate 23.

When the pivot plate 23 is pivotally moved back to the closed position, as shown in FIG. 12A, the path guide portion 131 is pulled by the interlocking portion 127A to pivotally move about the center axis O3 of pivotal movement in a clockwise direction in FIG. 12A. Thus, the path guide portion 131 moves pivotally in a direction toward the side of the closed position of the pivot plate 23. Thus, the path guide portion 131 pivotally moves in a mechanically interlocked manner with the pivot plate 23.

(Other Embodiments)

In the above-described first embodiment, the coil springs are used as the interlocking portion 27A that interlocks the switching guide portion 27 with the pivot plate 23. However, the configuration of the interlocking portion 27A may be modified. For example, one or more link bars formed of one or more rigid bodies may be used as the interlocking portion 27A.

In the above-described embodiments, the switching guide portion 27 is interlocked with the pivot plate 23 via the interlocking portion 27A or 127A. However, the switching guide portion 27 and the pivot plate 23 may be integrated together into a single component.

In the above-described embodiments, the opening/closing cover 14 constitutes part of the sheet discharge tray 13. However, the opening/closing cover 14 may not constitute part of the sheet discharge tray 13.

In the above-described embodiments, the image forming apparatus 1 is provided with the scanner section 50 at a vertical level higher than the printer section 10. However, this arrangement may be modified. For example, the scanner section 50 may be omitted from the image forming apparatus 1.

While the description has been made in detail with reference to specific embodiments thereof, it would be apparent to those skilled in the art that various changes and modifications may be made therein without departing from the spirit and scope of the above described embodiments.

For example, the arrangements employed in more than one embodiment among the above-described embodiments may be combined together.

What is claimed is:

1. An image forming apparatus comprising:
    an image forming portion configured to form an image on a sheet;
    an apparatus body having a housing configured to enclose the image forming portion therein, the housing having a sheet discharge tray at its vertically upper portion, the sheet discharge tray being configured to receive thereon a sheet having an image formed thereon;
    a discharge roller provided in a first conveying path and configured to discharge, onto the sheet discharge tray, a sheet that has been conveyed by the first conveying path, the first conveying path having a curved part that is configured to guide a sheet, which has been conveyed from the image forming portion, to the discharge roller, while changing an orientation of the sheet;
    a pivot plate pivotally movable relative to the apparatus body between an open position and a closed position, the pivot plate at the open position constituting a second conveying path, the second conveying path being a straight path configured to guide a sheet, which has been conveyed from the image forming portion, linearly toward an outside of the housing, the pivot plate at the closed position closing the second conveying path;
    an image reading device provided at a vertical level higher than the sheet discharge tray; and
    a pair of hinge portions connecting the image reading device to the apparatus body such that the image reading device is pivotally movable relative to the apparatus body, the pair of hinge portions including a first hinge portion and a second hinge portion which are arranged apart from each other in a width direction along a horizontal direction,
    each of the first and second hinge portions being elongated in the width direction,
    the first hinge portion having a widthwise inner end and a widthwise outer end opposite to each other in the width direction, the widthwise inner end of the first hinge portion being closer to the second hinge portion than the widthwise outer end of the first hinge portion is in the width direction,
    the second hinge portion having a widthwise inner end and a widthwise outer end opposite to each other in the width direction, the widthwise inner end of the second hinge portion being closer to the first hinge portion than the widthwise outer end of the second hinge portion is in the width direction,
    wherein the image reading device and the pivot plate are arranged relative to each other such that in a state the pivot plate is at the closed position, the image reading device and part of the pivot plate overlap with each other when the image reading device and the pivot plate are projected onto a virtual vertical plane that is parallel to a center axis of pivotal movement of the image reading device,
    wherein the pivot plate is arranged relative to the pair of hinge portions such that when the pivot plate is at the closed position, a free end of the pivot plate is positioned at a vertical level higher than the pair of hinge portions, and
    wherein the pivot plate is arranged relative to the pair of hinge portions such that the free end of the pivot plate moves in a space defined between a first virtual vertical plane and a second virtual vertical plane, the first virtual vertical plane being defined as a virtual vertical plane on which the widthwise inner end of the first hinge portion is disposed, and which is perpendicular to a rotational center axis of the first hinge portion, and the second virtual vertical plane being defined as a virtual vertical plane on which the widthwise inner end of the second hinge portion is disposed, and which is perpendicular to a rotational center axis of the second hinge portion.

2. The image forming apparatus according to claim 1, wherein a center axis of pivotal movement of the pivot plate is positioned at a vertical level lower than the pair of hinge portions.

3. The image forming apparatus according to claim 1, wherein the image reading device and the pivot plate are arranged relative to each other:
    such that when the pivot plate is at the closed position and the image reading device is pivotally moved in a direction away from the sheet discharge tray, the image reading device contacts the pivot plate and causes the pivot plate to pivotally move together with the image reading device.

4. The image forming apparatus according to claim 1, wherein the image forming portion is of an electrophotographic type, and includes: a photosensitive drum configured to bear developing material thereon; a heating body configured to heat developing material transferred on a sheet; and a pressing body configured to press the sheet against the heating body, and
    wherein the heating body is positioned at a vertical level higher than the photosensitive drum and lower than the discharge roller.

5. The image forming apparatus according to claim 1, further comprising a sheet supply tray disposed at a vertical level lower than the image forming portion, the sheet supply tray being configured to receive a sheet mounted therein, wherein the first conveying path is arranged to convey a sheet from the sheet supply tray through the image forming portion to the discharge roller in a first sheet conveying direction, wherein the first conveying path is arranged such that when the first conveying path is projected onto a virtual vertical plane parallel to a sheet discharge direction, in which the discharge roller discharges a sheet onto the sheet discharge tray, the first conveying path has an S-shape, wherein the curved part of the first conveying path is at a position that is downstream from an outlet port of the image forming portion and upstream from the discharge roller in the first sheet conveying direction, and wherein the first conveying path has another curved part at a position that is downstream from the sheet supply tray and upstream from an inlet port of the image forming portion in the first sheet conveying direction.

6. The image forming apparatus according to claim 1, wherein the discharge roller is configured to switch between: a mode of conveying a sheet in a sheet discharging direction to discharge a sheet toward the sheet discharge tray; and a mode of reversing a direction of conveying a sheet from the sheet discharging direction and feeding a sheet to a re-conveying path that is arranged to convey the sheet back to an inlet port of the image forming portion.

7. An image forming apparatus comprising:

an image forming portion configured to form an image on a sheet;

an apparatus body having a housing configured to enclose the image forming portion therein, the housing having a sheet discharge tray at its vertically upper portion, the sheet discharge tray being configured to receive thereon a sheet having an image formed thereon;

a discharge roller provided in a first conveying path and configured to discharge, onto the sheet discharge tray, a sheet that has been conveyed by the first conveying path, the first conveying path having a curved part that is configured to guide a sheet, which has been conveyed from the image forming portion, to the discharge roller, while changing an orientation of the sheet;

a pivot plate pivotally movable relative to the apparatus body between an open position and a closed position, the pivot plate at the open position constituting a second conveying path, the second conveying path being a straight path configured to guide another sheet, which has been conveyed from the image forming portion, linearly toward an outside of the housing, the pivot plate at the closed position closing the second conveying path;

an image reading device provided at a vertical level higher than the sheet discharge tray, the image reading device having a document cover configured to move between a position where the document cover covers a document table and a position where the document cover exposes the document table, the document table being configured to receive a document mounted thereon; and a pair of hinge portions connecting the document cover to the document table such that the document cover is pivotally movable relative to the document table, the pair of hinge portions including a first hinge portion and a second hinge portion which are arranged apart from each other in a width direction along a horizontal direction, each of the first and second hinge portions being elongated in the width direction, the first hinge portion having a widthwise inner end and a widthwise outer end opposite to each other in the width direction, the widthwise inner end of the first hinge portion being closer to the second hinge portion than the widthwise outer end of the first hinge portion is in the width direction, the second hinge portion having a widthwise inner end and a widthwise outer end opposite to each other in the width direction, the widthwise inner end of the second hinge portion being closer to the first hinge portion than the widthwise outer end of the second hinge portion is in the width direction, wherein the image reading device and the pivot plate are arranged relative to each other such that in a state that the pivot plate is at the closed position, the image reading device and part of the pivot plate overlap with each other when the image reading device and the pivot plate are projected onto a virtual vertical plane that is parallel to a center axis of pivotal movement of the document cover, wherein the pivot plate is arranged relative to the image reading device such that when the pivot plate is at the closed position, a free end of the pivot plate is positioned at a vertical level higher than a lower end of the image reading device, and wherein the pivot plate is arranged relative to the pair of hinge portions such that the free end of the pivot plate moves in a space defined between a first virtual vertical plane and a second virtual vertical plane, the first virtual vertical plane being defined as a virtual vertical plane on which the widthwise inner end of the first hinge portion is disposed, and which is perpendicular to a rotational center axis of the first hinge portion, and the second virtual vertical plane being defined as a virtual vertical plane on which the widthwise inner end of the second hinge portion is disposed, and which is perpendicular to a rotational center axis of the second hinge portion.

8. The image forming apparatus according to claim 7, wherein a center axis of pivotal movement of the pivot plate is positioned at a vertical level lower than the pair of hinge portions.

9. The image forming apparatus according to claim 7, wherein the image forming portion is of an electrophotographic type, and includes: a photosensitive drum configured to bear developing material thereon; a heating body configured to heat developing material transferred on a sheet; and a pressing body configured to press the sheet against the heating body, and wherein the heating body is positioned at a vertical level higher than the photosensitive drum and lower than the discharge roller.

10. The image forming apparatus according to claim 7, further comprising a sheet supply tray disposed at a vertical level lower than the image forming portion, the sheet supply tray being configured to receive a sheet mounted therein, wherein the first conveying path is arranged to convey a sheet from the sheet supply tray through the image forming portion to the discharge roller in a first sheet conveying direction, wherein the first conveying path is arranged such that when the first conveying path is projected onto a virtual vertical plane parallel to a sheet discharge direction, in which the discharge roller discharges a sheet onto the sheet discharge tray, the first conveying path has an S-shape, wherein the curved part of the first conveying path is at a position that is downstream from an outlet port of the image forming portion and upstream from the discharge roller in the first sheet conveying direction, and wherein the first conveying path has another curved part at a position that is downstream from the sheet supply tray and upstream from an inlet port of the image forming portion in the first sheet conveying direction.

11. The image forming apparatus according to claim 7, wherein the discharge roller is configured to switch between: a mode of conveying a sheet in a sheet discharging direction to discharge a sheet toward the sheet discharge tray; and a mode of reversing a direction of conveying a sheet from the sheet discharging direction and feeding a sheet to a re-conveying path that is arranged to convey the sheet back to an inlet port of the image forming portion.

* * * * *